(12) United States Patent
Furuya

(10) Patent No.: US 6,389,301 B1
(45) Date of Patent: May 14, 2002

(54) PORTABLE RADIO INFORMATION TERMINAL APPARATUS, DISPLAY SCREEN OPERATING METHOD, RECORDING MEDIUM, AND MICROCOMPUTER APPARATUS

(75) Inventor: Mami Furuya, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/219,418

(22) Filed: Dec. 23, 1998

(30) Foreign Application Priority Data

Dec. 25, 1997 (JP) .............................. 9-356495

(51) Int. Cl.[7] .................................................. H04Q 1/38
(52) U.S. Cl. ........................ 455/566; 455/575; 455/412
(58) Field of Search .......................... 455/90, 575, 566, 455/560, 154, 155.1, 156.1, 158.1, 158.2, 158.3, 158.4, 158.5, 159.1, 159.2; 345/123; 340/825.44

(56) References Cited

U.S. PATENT DOCUMENTS

| | | | | |
|---|---|---|---|---|
| 4,949,085 A | * | 8/1990 | Fisch et al. ............ | 340/825.44 |
| 5,285,493 A | * | 2/1994 | Wagai et al. ................ | 379/58 |
| 5,712,624 A | * | 1/1998 | Ayerst et al. .......... | 340/825.44 |
| 6,249,689 B1 | * | 12/1998 | Aizawa ...................... | 455/566 |
| 5,936,548 A | * | 10/1999 | Takatsuka .............. | 340/825.44 |
| 6,073,036 A | * | 6/2000 | Heikkinen et al. .......... | 455/575 |
| 6,138,039 A | * | 10/2000 | Sudo et al. ................. | 455/566 |
| 6,178,338 B1 | * | 1/2001 | Yamagishi et al. ......... | 455/566 |
| 6,246,406 B1 | * | 6/2001 | Nielsen et al. .............. | 345/340 |

* cited by examiner

Primary Examiner—William Trost
Assistant Examiner—Tilahun Gesesse
(74) Attorney, Agent, or Firm—Jay H. Maioli

(57) ABSTRACT

A portable radio information terminal apparatus capable of promptly moving a screen display to a desired layer in a multilayer screen display structure and a screen operating method for use in the apparatus. The terminal apparatus includes a command inputting discriminating circuit for determining whether an input signal supplied from an inputting circuit is generated by a predetermined command inputting operation, a movement control circuit for determining, based on a decision made by the command inputting discriminating circuit, whether the generated input signal continues and, if the generated input signal is found continuing, activating a layer-to-layer moving circuit and, if the generated input signal is stopped, stopping the layer-to-layer moving circuit. The layer-to-layer moving circuit causes for a layer-to-layer moving operation based on a command issued by the movement control circuit and executing a screen displaying operation on a destination layer, wherein, while the generated input signal continues, the layer-to-layer moving operation and the screen display operation on the destination layer are repeated.

4 Claims, 13 Drawing Sheets

F I G. 5
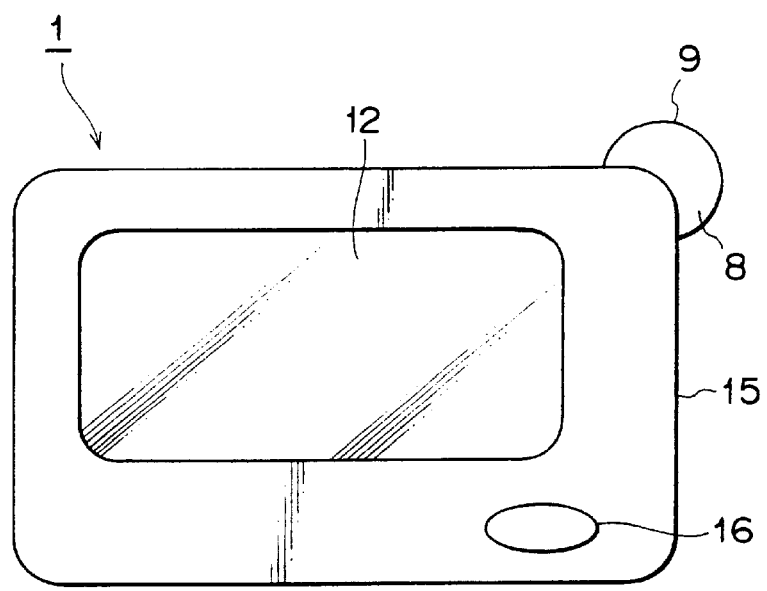
F I G. 6
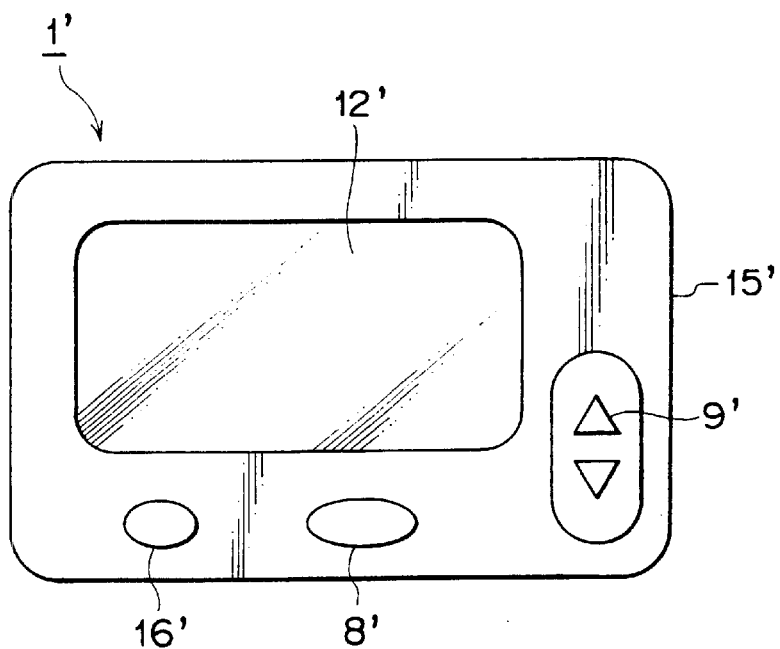

PORTABLE RADIO INFORMATION TERMINAL APPARATUS, DISPLAY SCREEN OPERATING METHOD, RECORDING MEDIUM, AND MICROCOMPUTER APPARATUS

BACKGROUND OF THE INVENTION

The present invention generally relates to a portable radio information terminal apparatus and a display screen operating method. More particularly, the present invention relates to a portable radio information terminal apparatus, especially a paging device in which received message information is controlled in a hierarchical structure for a display screen at each of the hierarchies and to a display screen operating method for the paging device.

Portable ratio information terminal apparatuses having various constitutions and providing various capabilities and functioning as communication network terminals have been put in practical use to satisfy the recent wide-range and drastically expanding demands in information communication fields.

One example of such portable information terminal apparatuses is a paging device for signal reception by radio. The paging device in its infancy was a terminal apparatus that beeps upon reception of a call signal from a radio base station. In operation, a call signal is sent from a wire telephone through radio to the user carrying the pager on the road. Upon reception of the call signal, the user makes a call to the caller from a nearby wire telephone.

Recently, paging devices have been developed and in an extensive use that have capabilities of receiving not only a simple call signal but also a signal carrying various information from a radio base station and displaying the received information on their liquid crystal display panel as a message.

With these paging devices, message statements obtained from the received information are organized in a message file, which is stored in a message storage memory of each paging device. In addition to the bodies of messages, the message file stores the attributes and control information of each message.

The attributes include, for example, the date and time of termination, size and type of the message and so forth. The message type identifies a personally originated message or a message originated by an information service entity for example. A code number is provided for each of these message types.

The control information includes, for example, a lock flag for preventing the message from being deleted from the received message file. In addition, the control information may include an index for specifying and updating a scroll format in execution of a scroll operation.

A message statement is displayed on the screen of the incorporated LCD (Liquid Crystal Display) panel in 4 lines of 20 characters each for example at once. If a message statement has more than 4 lines, a user scrolls the screen to read the entire message statement sequentially.

Conventional paging devices have come to provide a table of contents for facilitating reference to a plurality of terminated messages stored in the message storage memory. The table of contents may be formed by manually inputting the headlines by a user through some input device after checking the contents of received message statements. Generally, however, the table of contents is formed by a so-called thumb-nail method in which a part, especially a head, of a terminated message statement are copied for the header of the message statement in the table of contents.

In order to efficiently control these tables of contents data and the message data, these data are hierarchically structured. To be more specific, these data are constituted that the table of contents is placed on a higher layer and the message statements, namely a message file, is placed on a lower layer. Each layer is displayed on the screen.

As the number of terminating messages and the number of message types increase, the lower layer on which the message file is placed tends to be further divided into plurality of layers. As for the higher layer, the main menu mainly serving as the layer for the table of contents of message files tends to be hierarchically structured itself. In addition, for the top layer, a layer for a standby screen for example has been introduced. This standby screen layer operates in power-saving mode. Consequently, the multilayer configuration is widely adopted in the recent related art paging devices.

However, in the above-mentioned multilayer configuration, the user must repeat layer-to-layer movement to return from a lower layer to the main menu or the standby screen. These repeated operations are cumbersome and possibly lead to operation errors, presenting a problem in ease of operation.

In addition, the above-mentioned multilayer configuration takes time until the processing is completed, preventing the paging device from promptly entering power saving mode, which in turn preventing the efficiency of power usage from being improved.

SUMMARY OF THE INVENTION

It is therefore an object of the present invention to provide a portable radio information terminal apparatus and a display screen operating method thereof that control data in a hierarchical structure and allow the user to promptly move from a layer to another higher layer by a simple one-shot input operation.

In carrying out the invention and according to one aspect thereof, there is provided a display screen operating method for a portable radio information terminal apparatus for executing information control of a multilayer structure having a top layer and at least one lower layer on which a plurality of messages are placed, the portable radio information terminal apparatus having an inputting means capable of executing a command inputting operation and an image display device for displaying an image on screen, wherein screen operation processing with a moving operation from one of the layers to another combined with a screen displaying operation corresponding to the each layer is repetitively executable only during a period of time in which a predetermined command input operation is being executed.

Thus, depending on the time in which command input continues, every time a shift is made from a layer to another layer, a screen on that layer is displayed and an upper-layer moving operation is repeated only in the command input operation, so that adjusting the command input continuation time allows the user to continuously move to a desired layer while checking the screens being displayed halfway through this movement. Consequently, the novel method eliminates the related art drudgery in which movement to each upper layer is repeated until a desired layer is reached, thereby enhancing ease of operation.

The above-mentioned top layer is a main menu displaying layer, so that extending the command input continuation time allows the user to continuously move to the main menu on the top layer while checking the screen and to easily return to the main menu if lost halfway through moving between layers.

The above-mentioned top layer is a standby screen display layer, so that extending the command input continuation time allows the user to continuously move to the standby screen on the top layer which provides power saving with a simple operation while displaying message.

In carrying out the invention and according to another aspect thereof, there is provided a portable radio information terminal apparatus for executing information control of a multilayer structure having a top layer and at least one lower layer on which a plurality of messages terminated at the portable radio information terminal apparatus are placed, the top layer thereof being one of a main menu screen displaying layer and a standby screen displaying layer, the portable radio information terminal apparatus being capable of executing operations including screen displaying on each of the layers, the portable radio information terminal apparatus having an inputting means capable of executing a command inputting operation and an image display device for screen displaying, the portable radio information terminal apparatus comprising at least: a command inputting discriminating means for determining whether an input signal supplied from the inputting means is generated by a predetermined command inputting operation; a movement control means for determining, based on a decision made by the command inputting discriminating means, whether the generated input signal continues and, if the generated input signal is found continuing, activating a layer-to-layer moving means and, if the generated input signal is found stopped, stopping the layer-to-layer moving means; and the layer-to-layer moving means for causing a layer-to-layer moving operation based on a command issued by the movement control means and executing a screen displaying operation on a destination layer; wherein, while the generated input signal continues, the layer-to-layer moving operation and the screen display operation on the destination layer are repeated.

The above-mentioned novel constitution can realize a portable radio information terminal apparatus that determines a predetermined command input operation by the command input discriminating means, the movement control means, and the layer-to-layer moving means and repeats layer-to-layer movement and screen displaying on a destination layer while the command input operation continues. Consequently, adjusting the command input continuation time allows the user to continuously move to a desired layer while checking the displayed screen.

In carrying out the invention and according to still another aspect thereof, there is provided a recording medium that records, as programs readable and executable by a computer, at least: a command input discriminating means for determining whether an input signal generated while a portable radio information terminal apparatus having an image display device and an inputting device and executing information control on a multilayer structure of which top layer is one of a main menu displaying layer and a standby screen displaying layer is operating on one layer of the multilayer structure has been generated by a predetermined command inputting operation; a movement control means for determining, based on a decision made by the command input discriminating means, whether the generated input signal continues and, if the generated input signal is found continuing, activating a layer-to-layer moving means and, if the generated input signal is found stopped, stopping the layer-to-layer moving means; and the layer-to-layer moving means for causing a layer-to-layer moving operation based on a command issued by the movement control means and executing a screen displaying operation on a destination layer.

This recording medium is installed, as a memory device storing operating procedures executable by the central processing unit, onto the portable radio information terminal apparatus at least having the central processing unit, an input device, an image display device, a message recording memory, and a multilayer information control means. Consequently, this portable radio information terminal apparatus can be provided with capabilities of sequentially executing the stored operating procedures by the CPU, determining whether the input signal has been generated by a predetermined command input operation, and repeating layer-to-layer movement and screen displaying on destination layer while the generated input signal continues.

In carrying out the invention and according to yet another aspect thereof, there is provided a microcomputer apparatus of which recording means records, as programs readable and executable by the central processing unit of the microcomputer apparatus, a command input discriminating means for determining whether an input signal generated while a portable radio information terminal apparatus having an image display device and an inputting device and executing information control on a multilayer structure of which top layer is one of a main menu displaying layer and a standby screen displaying layer is operating on one layer of the multilayer structure has been generated by a predetermined command inputting operation; a movement control means for determining, based on a decision made by the command input discriminating means, whether the generated input signal continues and, if the generated input signal is found continuing, activating a layer-to-layer moving means and, if the generated input signal is found stopped, stopping the layer-to-layer moving means; and the layer-to-layer moving means for causing a layer-to-layer moving operation based on a command issued by the movement control means and executing a screen displaying operation on a destination layer.

Consequently, combining this microcomputer apparatus with a communication means, a received message storage memory, a multilayer information control means, an input device, an image display device, and a power supply circuit facilitates the realization, with a simple constitution, a portable radio information terminal apparatus having capabilities of sequentially executing the stored operating procedures by the CPU, determining whether the input signal has been generated by a predetermined command input operation, and repeating layer-to-layer movement and screen displaying on destination layer while the generated input signal continues.

In carrying out the invention and according to a different aspect thereof, there is provided a screen operating method for a portable radio information terminal apparatus for executing information control of a multilayer structure having a top layer and at least one lower layer on which a plurality of messages terminated at the portable radio information terminal apparatus with a radio wave are placed, the top layer thereof being one of a main menu screen displaying layer and a standby screen displaying layer, the portable radio information terminal apparatus being capable of executing operations including screen displaying on each of the layers, the portable radio information terminal apparatus having an inputting means capable of executing a command inputting operation and an image display device for screen displaying, wherein, if a continuation time of the command inputting operation is in excess of a predetermined time, the screen displaying moves to the top layer of the multilayer structure.

Consequently, executing a command input operation that continues over a predetermined length of time allows the user to promptly move to the top layer of the multilayer structure, eliminating the conventional drudgery in which movement to each upper layer is repeated until a desired layer is reached to enhance ease of operation.

In carrying out the invention and according to a still different aspect thereof, there is provided a portable radio information terminal apparatus for executing information control of a multilayer structure having a top layer and at least one lower layer on which a plurality of messages terminated at the portable radio information terminal apparatus with a radio wave are placed, the top layer thereof being one of a main menu screen displaying layer and a standby screen displaying layer, the portable radio information terminal apparatus being capable of executing operations including screen displaying on each of the layers, the portable radio information terminal apparatus having an inputting means capable of executing a command inputting operation and an image display device for screen displaying, the portable radio information terminal apparatus comprising at least: a command input processing means for determining whether an input signal supplied from the input means has been generated by a predetermined command inputting operation; a movement control means for counting, based on a decision made by the command input processing means, a continuation time of the generated input signal and, if the continuation time is found exceeding a predetermined time, instructing an upper-layer moving means to move screen displaying to the top layer and, if the continuation time is found within the predetermined time, instructing the upper-layer moving means to move screen displaying to an adjacent upper layer; and the upper layer moving means for executing, based on a command issued by the movement control means, movement to at least one of the top layer and the adjacent upper layer.

The above-mentioned novel constitution can realize the portable radio information terminal apparatus that can detect a predetermined command input operation by the command input processing means, the movement control means, and the upper-layer moving means and, if this command input operation is found exceeding the predetermined length of time, promptly move screen displaying to the top layer.

In carrying out the invention and according to yet different aspect thereof, there is provided a recording medium that records, as procedures (programs) readable and executable by a computer, at least: a command input processing means for determining whether an input signal generated while a portable radio information terminal apparatus having an image display device and an inputting device and executing information control on a multilayer structure of which top layer is one of a main menu displaying layer and a standby screen displaying layer is operating on one layer of the multilayer structure has been generated by a predetermined command inputting operation; a movement control means for counting, based on a decision made by the command input processing means, a continuation time of the generated input signal and, if the continuation time is found exceeding a predetermined time, instructing an upper-layer moving means to move screen displaying to the top layer and, if the continuation time is found within the predetermined time, instructing the upper-layer moving means to move screen displaying to an adjacent upper layer; and the upper-layer moving means for executing, based on a command issued by the movement control means, movement to at least one of the top layer and the adjacent upper layer.

Consequently, installing this recording medium as a memory device storing the operating procedures readable and executable by the central processing unit onto the portable radio information terminal apparatus having the CPU, an input device, an image display device, a message recording memory, and a multilayer information control means and allowing the CPU to sequentially executing the operating procedures provide this portable radio information terminal apparatus with capabilities of determining whether the input signal has been generated by a predetermined command input operation, counting a time in which the generated input signal continues and, if the continuation time is found exceeding a predetermined length of time, moving screen displaying to the top layer, and, if the continuation time is found within the predetermined length of time, moving screen displaying to an adjacent upper layer.

In carrying out the invention and according to a separate aspect thereof, there is provided a microcomputer apparatus of which recording means records, as programs readable and executable by the central processing unit of the microcomputer apparatus, at least: a command input processing means for determining whether an input signal generated while a portable radio information terminal apparatus having an image display device and an inputting device and executing information control on a multilayer structure of which top player is one of a main menu displaying layer and a standby screen displaying layer is operating on one layer of the multilayer structure has been generated by a predetermined command inputting operation; a movement control means for counting, based on a decision made by the command input processing means, a continuation time of the generated input signal and, if the continuation time is found exceeding a predetermined time, instructing an upper-layer moving means to move screen displaying to the top layer and, if the continuation time is found within the predetermined time, instructing the upper-layer moving means to move screen displaying to an adjacent upper layer; and the upper-layer moving means for executing, based on a command issued by the movement control means, movement to at least one of the top layer and the adjacent upper layer.

Consequently, combining this microcomputer apparatus with a communication means, a received message storage memory, a multilayer information control means, an input device, an image display device, and a power supply circuit facilitates the realization, with a simple constitution, a portable radio information terminal apparatus having capabilities of determining whether the input signal has been generated by a predetermined command input operation, counting the continuation time of the generated input signal, moving screen displaying to the top layer if the continuation time is found exceeding a predetermined length of time, and moving screen displaying to an adjacent upper layer if the continuation time is found within the predetermined length of time.

BRIEF DESCRIPTION OF THE DRAWINGS

These and other objects of the invention will be seen by reference to the description, taken in connection with the accompanying drawing, in which:

FIG. 5 is a front view illustrating an example of the external constitution of one portable radio information terminal apparatus shown in FIGS. 1 and 2;

FIG. 6 is a front view illustrating an example of the external constitution of another portable radio information terminal apparatus shown in FIGS. 1 and 2;

DETAILED DESCRIPTION OF PREFERRED EMBODIMENTS

This invention will be described in further detail by way of examples with reference to the accompanying drawings. It should be noted that the preferred embodiments to be described later are only some of the preferred examples that are intended for use in describing the essential constitutions and functions of the present invention. Therefore, despite various limitations preferred in technological constitution, the present invention is not limited to these preferred embodiments unless otherwise specified.

Figure 1:
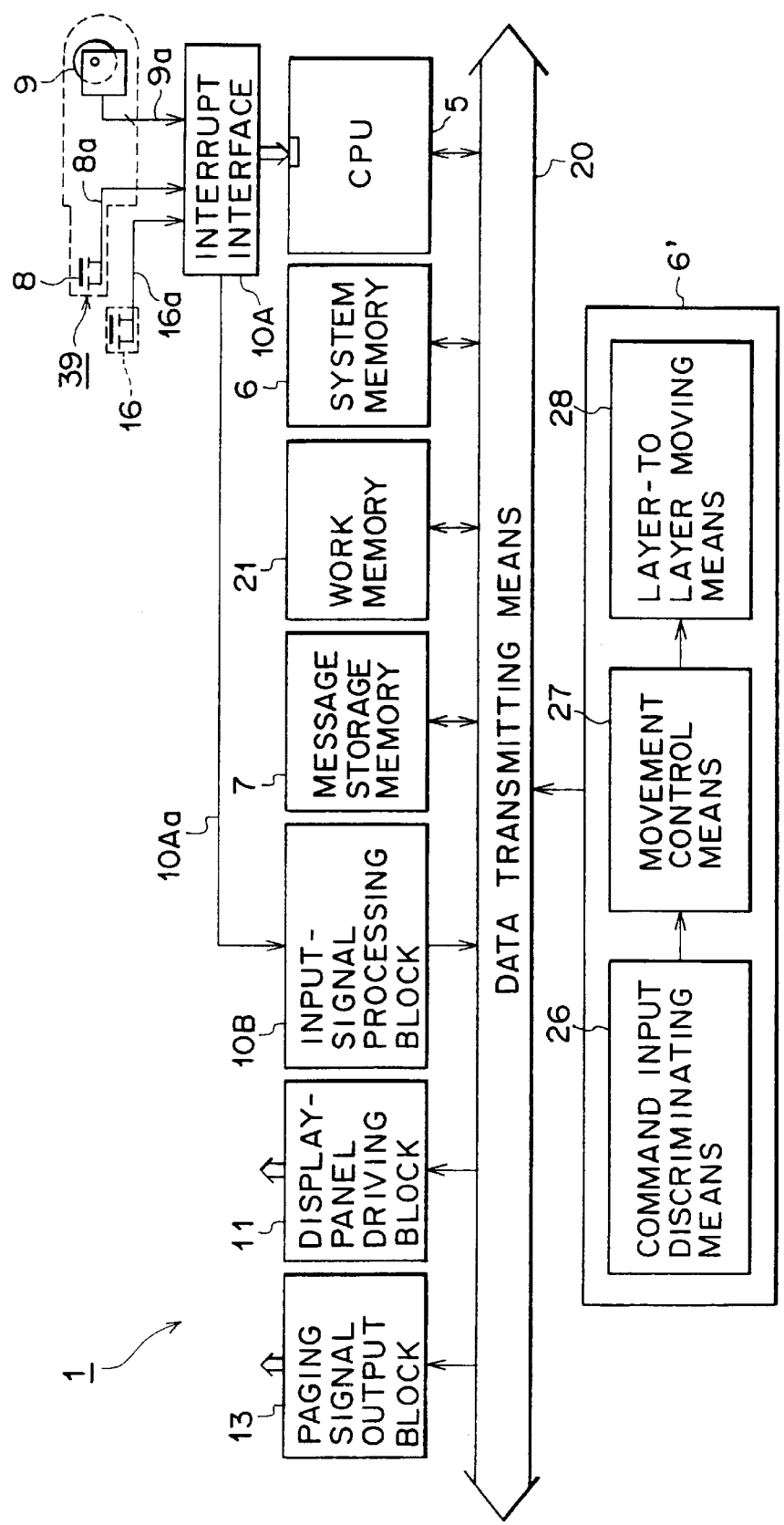
FIG. 1 is a block diagram illustrating a main constitution of a portable radio information terminal apparatus practiced as a first preferred embodiment of the invention.
Figure 2:
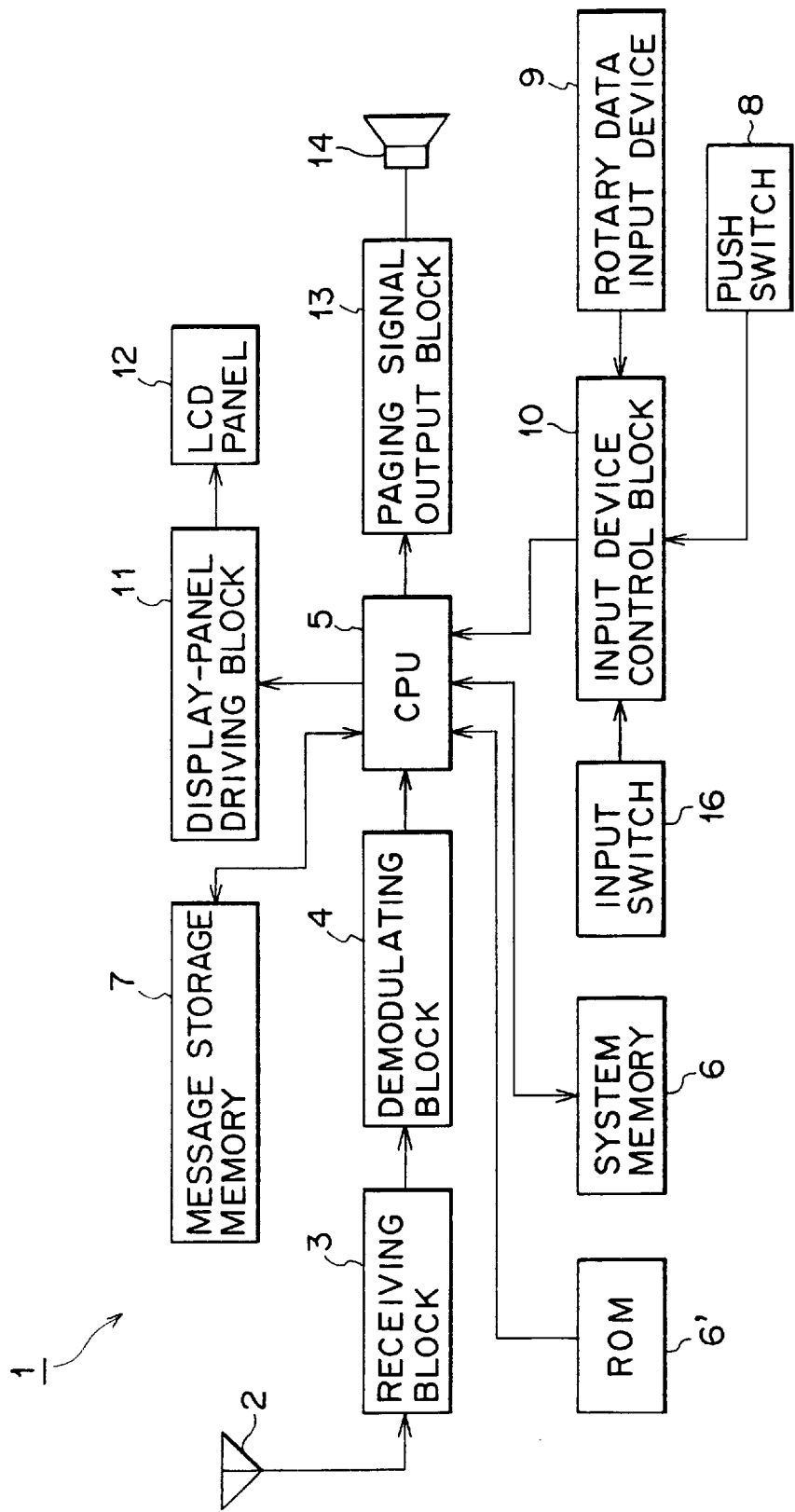
FIG. 2 is a block diagram illustrating an overall constitution of the portable radio information terminal apparatus shown in FIG. 1.

FIG. 1 shows the main constitution of a portable radio information terminal apparatus practiced as a first preferred embodiment of the invention. FIG. 2 shows the overall constitution of the portable radio information terminal apparatus shown in FIG. 1. FIG. 5 is a front view illustrating an example of the external constitution of the portable radio terminal apparatus shown in FIG. 1. FIG. 6 is a front view illustrating another example of the external constitution of the portable radio terminal apparatus shown in FIG. 1.

As shown in FIG. 2, the portable radio information terminal apparatus 1 shown in FIG. 1 is a paging device. This paging device comprises an antenna 2 for receiving radio waves transmitted from a remote transmission base station such as a radio base station, a receiving block 3 connected to the antenna 2 for amplifying and detecting a signal received at the antenna 2, and a demodulating block 4, which is a decoder connected to the receiving block 3, for decoding code information from the terminated signal. These components constitute a communication means.

The demodulating block 4 includes an A/D converter to generate digital information and has a capability of comparing an ID code stored in an ID memory not shown constituted by an EEPROM (Electrically Erasable Programmable ROM) for example and the above-mentioned code information to determine whether the received information is the information addressed to this terminal apparatus. The output of the demodulating block 4 is connected to a CPU 5.

The CPU 5 is further connected to a message storage memory 7 constituted by an SRAM (Static Random Access Memory) for example.

The CPU 5 controls data processing and data input/output processing. To be more specific, based on various executable procedures (namely, programs) stored in an internal or external ROM, the CPU 5 controls the operations of the entire apparatus such as fetching of an input signal supplied from an input device to be described later, writing of data to a message storage memory 7, organizing of message files, reading of message sentence stored in files, displaying of messages and other information onto the display screen, and notifying of call termination and troubles such as abnormal voltage.

Moreover, the CPU 5 controls copying and organizing of a table of contents and a table-of-contents display image and controls hierarchical structure information in which the table of contents and the table-of-contents display image are placed on an upper layer as the main menu and a message file is placed on a lower layer.

The message information in the code information generated by the demodulating block 4 based on the terminated signal is stored in the message storage memory 7. The stored message information is then read to be displayed on the display screen. The message storage memory 7 can be constituted by any of such a nonvolatile memory as the above-mentioned SRAM, a flash memory, or an EEPROM.

For data input means to be operated by a user, a rotary data input device 9 and a push switch 8 integrally constituted with the rotary data input device 9 are provided. Thus, the rotary data input device 9 and the push switch 8 integrally constitute a rotary/push data input device 39, which will be described later in detail.

For another data input device to be operated by the user, an input switch 16 is provided. The input switch 16 is a non-rotary data input device to act by a non-rotary operation such as pressing or touching, for generating an input signal 16a. The input signal 16a generated by the data input switch 16 is herein referred to as a non-rotary input signal. In the present embodiment, the input switch 16 is used for performing an escape operation or a simultaneous composite input operation.

The rotary data input device 9, the push switch 8, and the input switch 16 are connected to an input device control block 10, which is connected to the CPU 5.

The CPU 5 is also connected to a display panel driving block 11, which is connected to a LED panel 12 as a display screen. Namely, the display panel driving block 11 and the LCD panel 12 constitute an image display device.

A display signal outputted from the CPU 5 is sent to the display panel driving block 11. Based on the display signal, the display panel driving block 11 inputs a drive signal into the LCD panel 12 to drive the LCD panel 12 for forming a screen.

The CPU 5 is also connected to a paging signal output block 13, which is connected to a speaker 14 as a sounding paging device. The CPU 5 outputs an operating signal for operating the speaker 14, the operating signal being inputted into the paging signal output block 13 to be converted into an audio signal by which the speaker 14 is driven.

Thus, the control means is constituted by the CPU 5, the input device control block 10, and so on. Now, the main constitution of the embodiment will be described with reference to FIG. 1.

A data transmitting means 20, which functions as a data bus, is connected to the CPU 5, a system memory 6, a ROM 6', the message storage memory 7, an input signal processing block 10B, the display panel driving block 11, and the paging signal output block 13.

Through the data transmitting means, the CPU 5 sends/receives data to/from the system memory 6, the ROM 6', the message storage memory 7, the display panel driving block 11, the paging signal output block 13, and the input signal processing block 10B.

The system memory 6 stores means for organizing information in a hierarchical structure and various procedures for controlling addition, deletion, and locking of information data and the operations of the entire apparatus, in the form of programs executable by the CPU 5.

The ROM 6' mainly stores application-related execution procedures in the form of programs executable by the CPU 5. The ROM 61 is constituted by a read-only MOS (Metal Oxide Semiconductor) memory or a flash memory for example.

Figure 3:
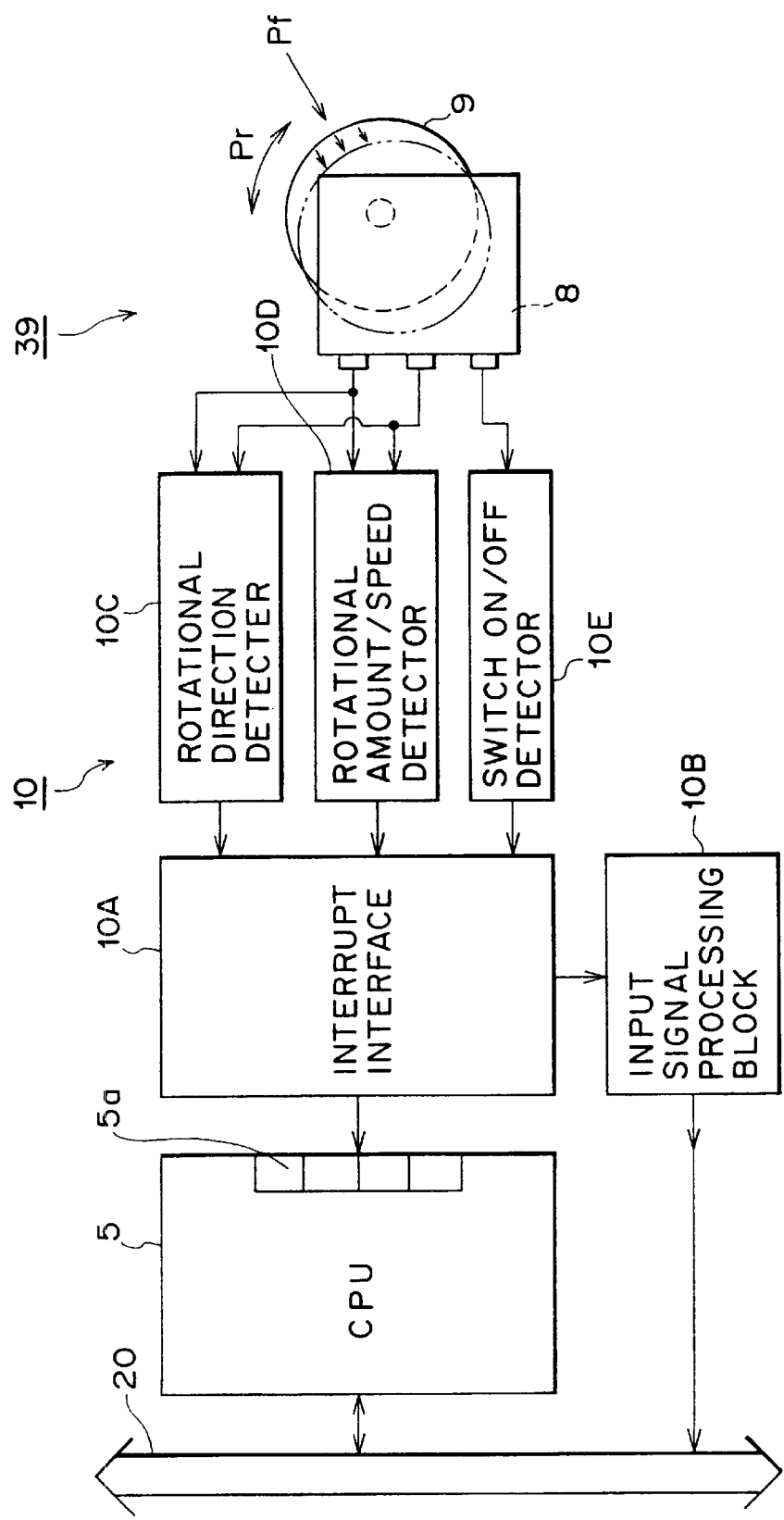
FIG. 3 is a block diagram illustrating one example of a rotary and push input device applied to the portable radio information terminal apparatuses associated with the invention.

FIG. 3 shows one example of the rotary/push data input device. As shown, the rotary/push data input device 39 is integrally constituted with the rotary data input device 9 and the push switch 8.

The rotary/push data input device 39 allows the portable radio information terminal apparatus to be reduced in size and the number of components used therein. For example, this data input device is commercially available as a jog dial or a rotary encoder. The rotary operating section has a freely rotatable disc knob and the push operating section is adapted to generate an on/off signal when the disc knob is pushed.

Therefore, rotating the disc knob clockwise (to the right) or counterclockwise (to the left) easily provides two lines of input signals. In addition, because the on/off signal can be obtained by pushing the disc knob, the number of control switches is reduced, reducing the apparatus dimensions and enhancing ease of use.

The rotary data input device 9 has a knob rotatable in the direction of arrow Pr. Rotating this knob clockwise or counterclockwise effects an input operation, generating a signal 9a responsive to the knob rotational direction at the terminal. This signal is herein referred to as a rotary input signal 9a.

On the other hand, the push switch 8, when the knob is pressed in the direction of arrow Pf as shown in the figure, moves in a stroke, generating an on/off signal 8a at the terminal. The on/off signal is herein referred to as an on/off input signal 8a.

The information on the rotary direction of the knob of the rotary data input device 9 is inputted in an interrupt interface 10A as a signal obtained at the terminal by a rotational direction detector 10C constituting the input device control block 10. Based on the input, the interrupt interface 10A generates an interrupt signal and, at the same time, forms a signal 10Aa (see FIG. 1) carrying the knob rotational direction information and inputs the signal 10Aa into the input signal processing block 10B.

Upon reception of the signal 10Aa, the input signal processing block 10B outputs the signal immediately or after holding it, to the data transmitting means 20. This information is fetched when a rotational direction discriminating means (not shown) of a rotary device stored in the system memory 6.

If the input signal processing block 10B outputs the signal 10Aa immediately to the data transmitting means 20, the knob rotational direction information is used only once. Namely, one knob operation corresponds to one processing operation.

On the other hand, if the input signal processing block 10B holds the signal 10Aa before outputting the same to the data transmitting means, the knob rotational direction information can be used repeatedly. Therefore, if the knob is continuously rotated, the processing is repeatedly executed.

In addition, a rotational amount/speed detector 10D constituting the input device control block 10 can input rotational amount and speed information of the rotary data input device 9 into the interrupt interface 10A as a signal obtained at the terminal, and the signal can be fetched in subsequent processing.

The on/off signal 8a generated by the push switch 8 is inputted in the interrupt interface 10A as a signal obtained at the terminal by a switch on/off detector 10E constituting the input device control block 10.

The rotary data input device 9 and the push switch 8 are constituted to be separately operable. Therefore, the rotary data input device 9 and the push switch 8 may be simultaneously operated to simultaneously input plural pieces of data.

The rotary data input device 9 of the rotary/push data input device 39 is acted as a device to input the command signals for the entire control over the operations including display screen scrolling and selecting particular portions shown on screen. The push switch 8 functions as a data input device for establishing a selected portions and an entered numeral for example and inputting a signal for moving an operation from one layer to another for example.

A rotary input signal 9a generated by the rotary data input device 9, the on/off input signal 8a generated by the push switch 8, and a non-rotary input signal 16a generated by the input switch 16 provide interrupt signals through the interrupt interface 10A to be captured by the CPU 5 at its interrupt accepting terminal.

According to the above-mentioned constitution, if at least one of the rotary input signal 9a, the on/off input signal 8a, and the non-rotary input signal 16a, resulting from at least one of the operation being executed using the rotary data input device 9, the push switch 8, or input switch 16, is generated, the corresponding interrupt signal is inputted in the CPU 5 through the interrupt interface 10A, upon which the CPU goes into interrupt handling phase.

Figure 4:
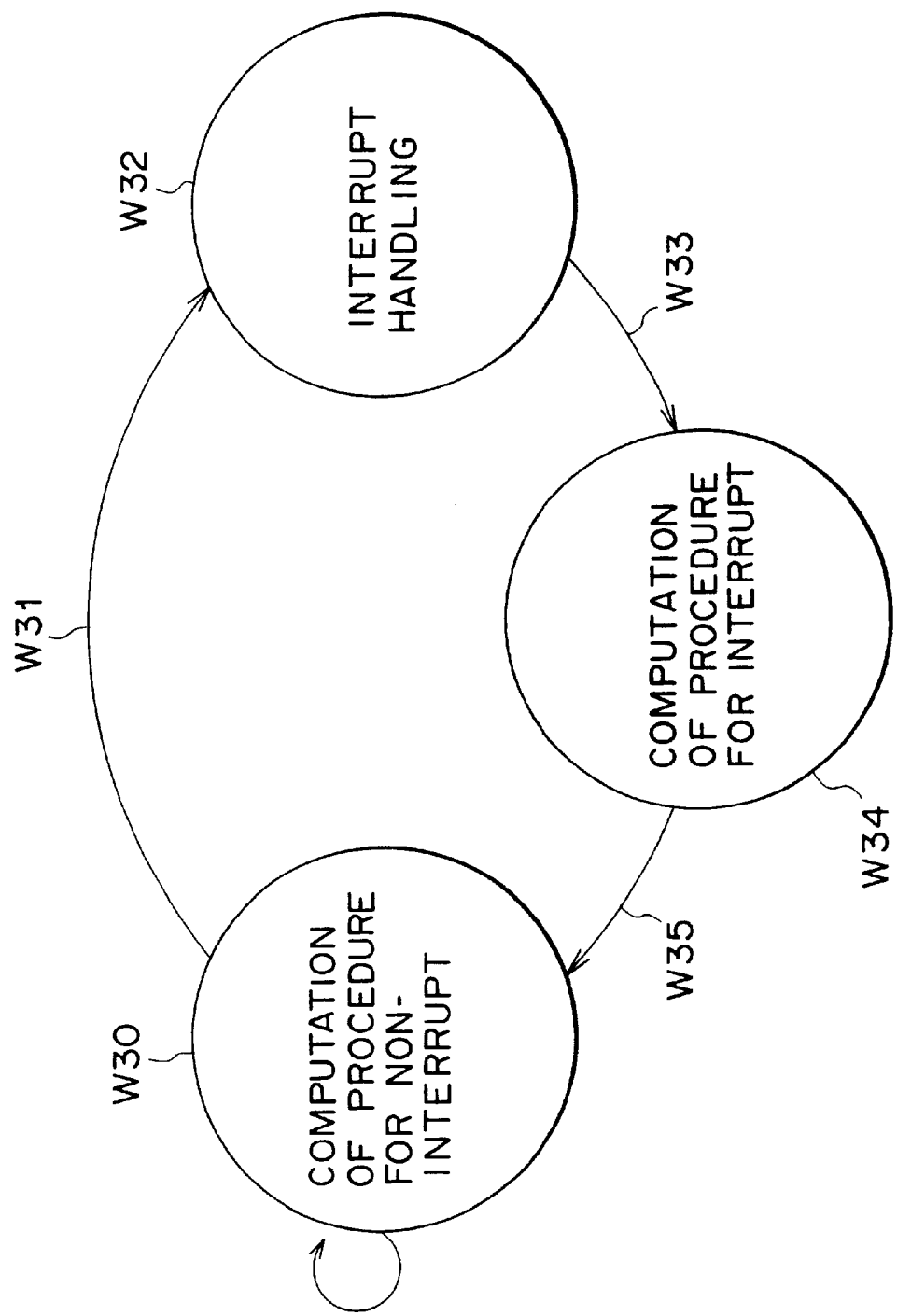
FIG. 4 is a diagram illustrating transitions of handling of an interrupt caused by the data input device shown in FIG. 3.

FIG. 4 is a transition diagram illustrating the processes of an interrupt handling caused by any of the above-mentioned input devices. The CPU 5 initially in the state of computation processing W30 of non-interrupt associated procedure receives an interrupt signal to detect interrupt occurrence W31. Then, the CPU 5 executes an interrupt signal handling procedure stored in the system memory 6 to perform interrupt signal handling W32. Here, the CPU 5 identifies the input device that caused this interrupt. This identification is made based directly on the interrupt accepting terminal or based on sending of the input signal 10Aa sent by the interrupt interface to the input signal processing block 10B.

In either input device identification processing, simultaneous input operations from a plurality of data input devices can be identified. Namely, if simultaneous input operations are made from a plurality of data input devices, the interrupt occurrence W31 is limited to one input device that generated the earliest interrupt signal. However, the CPU 5 confirms that a plurality of input operations were performed at once by referencing a queuing list in interrupt signal handling W32.

When an input device that generated an interrupt, namely an input device on which the user made an input operation, has been identified, the CPU 5 reads an interrupt associated procedure corresponding to the identified input device from the system memory 6 in W33, then getting into the computation of procedure for interrupt W34. When the input value for example from the input device has been established in W35, interrupt handling is completed, upon which the CPU 5 returns to the computation of procedure for non-interrupt W30. At this stage, the input value from the data input device is used.

The following describes various means stored in the ROM 6' with reference to FIG. 1. As shown, the ROM 6' stores a command input discriminating means 26, a movement control means 27, and a layer-to-layer moving means 28 in the form of procedures (namely programs) executable by the CPU 5.

The command input discriminating means 26 determines whether the input signal supplied from the input means has been generated by a predetermined command input operation.

Based on the determination made by the command input discriminating means 26, the movement control means 27 checks if the generated input signal continues. If the input signal is found continuing, the movement control means 27 activates the layer-to-layer moving means 28; and if the input signal is found ended, the movement control means 27 ends the layer-to-layer moving means 28.

The layer-to-layer moving means 28 effects a movement between layers based on the command of the movement control means 27, executing screen display of the destination layer.

The program form of each means may be any of those being executable directly or indirectly by CPU. Therefore, a form addressed as absolute binary is preferable. Alternatively, a form that requires readdressing at execution as relocatable binary may be used. In the latter case, however, a linkage means must be made resident in the system memory 6 for example.

FIG. 5 is a front view illustrating an example of the external constitution of one portable radio information terminal apparatus associated with the above-mentioned embodiment. The following describes this constitution with reference to FIG. 5.

As shown, the portable radio information terminal apparatus 1 is accommodated in a rectangular housing 15 which is low in profile. The LCD panel 12 is arranged on the front side of the housing 15 in generally the center thereof, for displaying a message and date and time for example.

A jog dial functioning as the rotary data input device 9 is arranged in the upper right portion of the housing 15, and a part of the jog dial projecting from the housing 15. As described before, the rotary/push data input device 39 has the freely rotatable knob, in both clockwise and counterclockwise direction, as the rotary data input device 9.

The push switch 8 is arranged integrally with the rotary data input device 9. Pushing the knob of the rotary data input device 9 turns on/off the push switch 8.

An input switch 16 functioning as an escape key is embedded lower and adjacent to the LCD panel 12 in a freely depressing manner. The input switch 16 is pressed by the user to input an escape command signal for movement to an upper layer, a stop command signal for stopping the alarm sound paging the termination of a call or a command signal for operation control.

In addition, the input switch 16 may be arranged slightly recessed towards the inside the housing 15 to prevent an external force from being easily applied to the input switch 16. This prevents an erroneous operation from occurring.

The LCD panel 12 displays a message composed of 4 lines each containing 20 alphanumeric characters for example.

FIG. 6 is a front view illustrating an example of the external constitution of another portable radio information terminal apparatus associated with the invention. A portable radio information terminal apparatus 1' associated with this example is accommodated in a rectangular housing 15' which is low in profile. The LCD panel 12' is arranged on the front side of the housing 15' in generally the center thereof, for displaying a message and date and time for example.

In the lower right corner of the housing 15', arrow-shaped buttons 9' for use in inputting scroll commands for example are arranged. To the left of the arrow-shaped buttons 9', a push switch 8' is arranged.

To the lower left of the LCD panel 12', an input switch 16' serving as an escape key is arranged embedded in a freely depressible manner. The escape key 16' is depressed by the user to input an escape command signal for movement to an upper layer, a stop command signal for stopping the alarm sound telling the termination of a call or a command signal for operation control.

The LCD panel 12' displays a screen composed of 4 lines each containing 20 alphanumeric characters for example.

The following describes operations of the portable radio information terminal apparatus associated with the above-mentioned embodiment. First, receiving of radio signals and displaying of messages, are explained which are usual operations of this apparatus, mainly with reference to FIG. 2.

When a radio wave carrying an information signal (a message for example) is transmitted from a radio transmission radio station to the particular portable radio information terminal apparatus 1, the same receives the radio wave at its antenna 2. The received radio signal is supplied to the receiving block 3, in which signal processing operations such as intermediate frequency conversion, amplification, and detection are performed on the received radio signal. The demodulating block 4 checks whether the signal is addressed to this portable radio information terminal apparatus. If the signal is found addressed thereto, the signal is restored. Then, information obtained by the restoration is stored in the message storage memory 7 under the control of the CPU 5.

One message file is newly generated for each message statement. The message file thus generated is placed on a lower layer in the hierarchical information structure.

An item for each newly generated message file is added to a table of contents (namely, the main menu) placed on an upper layer. It should be noted that the above-mentioned upper and lower layers are logical layers. Physically, the table of contents and message files are stored in the message storage memory 7 as files and folders.

Based on a control program stored in the system memory 6, the CPU 5 controls the operation of the portable radio information terminal apparatus 1. First, the CPU 5 determines whether an information signal has been received or not. If the information signal is found received, the CPU 5 activates the display panel driving block 11 to display a message contained in the received information read from the message file stored in the message storage memory 7 onto the LCD panel 12 in 4 lines each having 20 alphanumeric characters for example.

It should be noted that the image display device is not limited to the above-mentioned LCD panel 12. Any other image display devices including an organic EL (Electro-Luminescence) panel are available. The screen configuration is not limited to 4 lines each having 20 characters. Any other screen configurations may be used as required.

If the received signal is found, the CPU 5 also activates the paging signal output block 13, which sends an alarm signal to the speaker 14 to sound the same, paging the user of a call termination.

Figure 7:
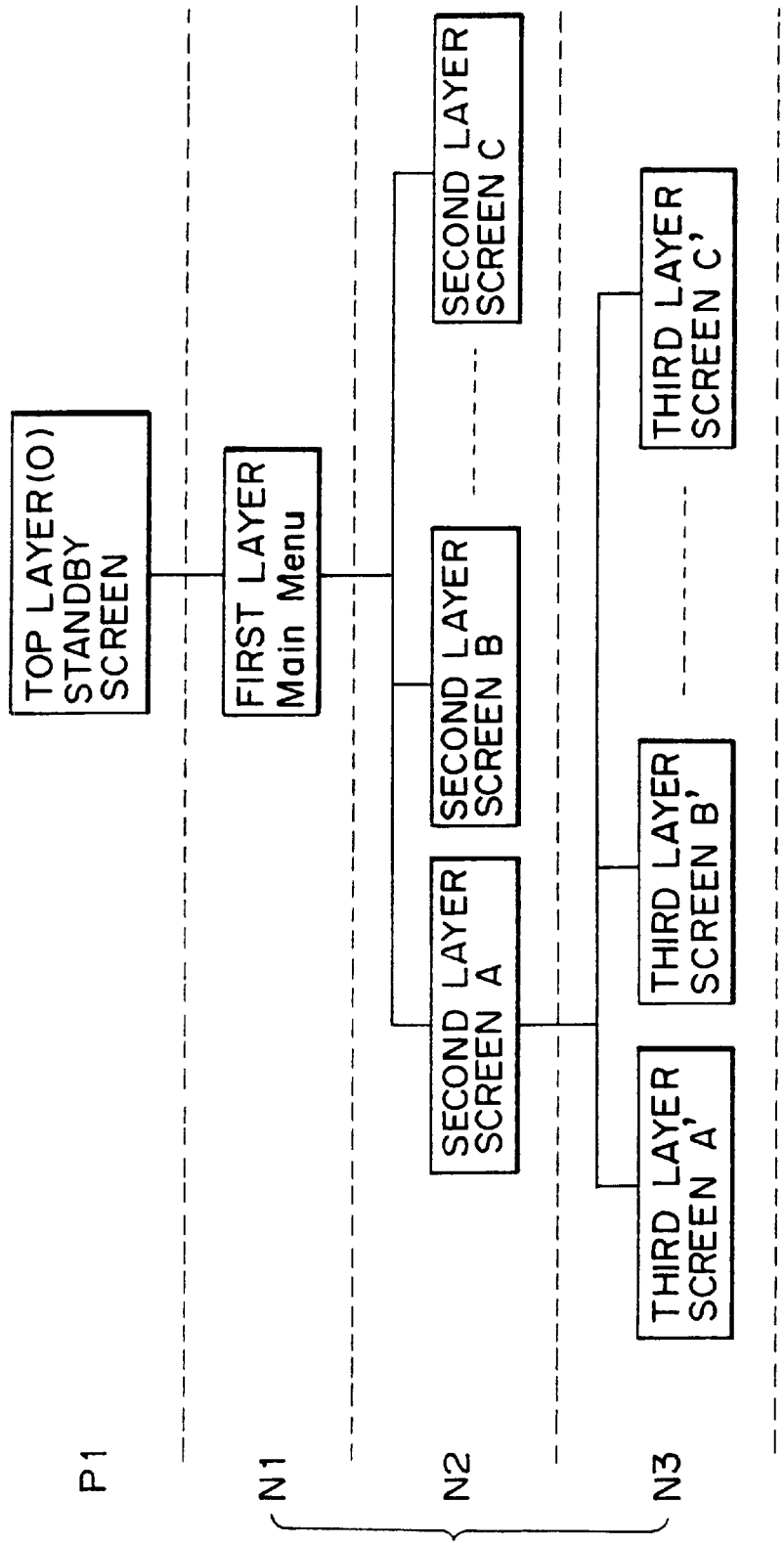
FIG. 7 is a diagram illustrating a multilayer structure of the portable radio information terminal apparatuses associated with the invention.

FIG. 7 illustrates a multilayer information structure of the portable radio information terminal apparatus of the present invention, in which screens corresponding to the layers are shown. As shown, the top layer (0) P1 displays a standby screen and provides power saving mode.

The first layer N1 displays the main menu. The second layer N2 displays screens A through C. The third layer N3 displays screens A' through C'.

Figure 8:
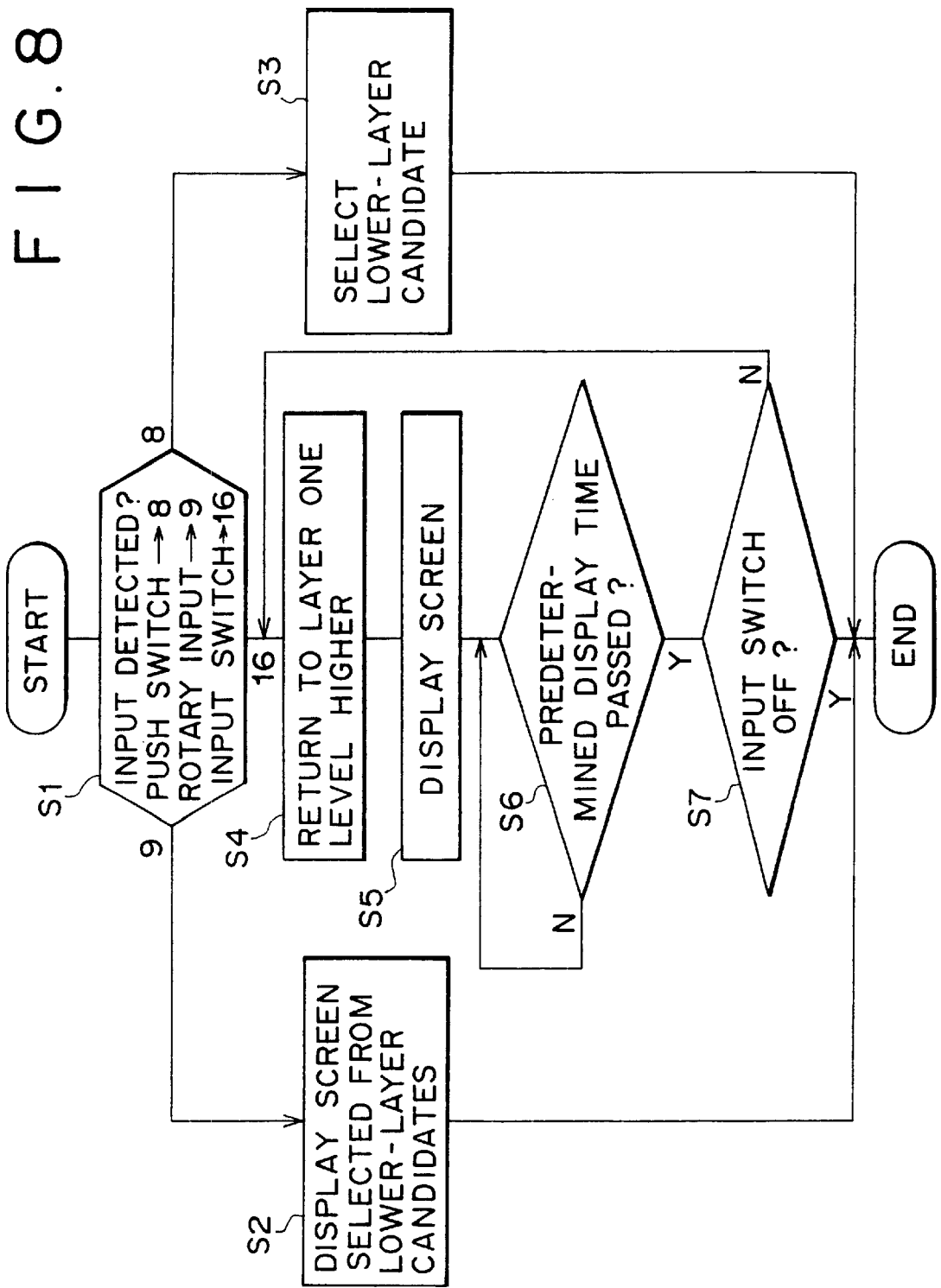
FIG. 8 is a flowchart indicative of operations of the portable radio information terminal apparatus practiced as a first preferred embodiment of the invention.

FIG. 8 is a flowchart indicative of the operation of the portable radio information terminal apparatus practiced as the first preferred embodiment of the invention. The following describes the operation with reference to FIG. 8.

In step S1, the command input discriminating means 26 determines the type of an input signal. If the input signal is found supplied from the rotary data input device 9, a corresponding screen selected from the lower-layer candidates is displayed in step S2, upon which the processing comes to an end.

On the other hand, if the input signal is found supplied from the push switch 8, a corresponding screen selected from the lower-layer candidates is displayed in step S3, upon which the processing comes to an end.

If the input signal is found supplied from the input switch 16, the layer-to-layer moving means 28 returns to a layer one level up in step S4 and displays a screen on that layer in step S5. At this moment, to allow the user to check the displayed screen, the processing gets in a loop, holding the displayed screen for a predetermined duration of time in step S6.

When the processing gets out of the loop after the predetermined duration of time, the CPU 5 determines whether the input switch 16 is off in step S7. If the input switch 16 is found not off, then, back in step S4, the layer-to-layer moving means 28 again returns to a layer one level up and displays a screen on that layer.

Thus, while the input switch 16 is kept pressed, movement to a layer one level up and screen displaying on that layer are executed repeatedly.

When the user releases the input switch 16 after a desired layer has been reached as a result of the repeated movement to a higher layer and screen displaying on that layer, the desired layer is kept active and the processing comes to an end.

As described and according to the above-mentioned embodiment, continuously pressing the input switch 16 for a desired duration of time allow the user to return to an upper layer while displaying the screen of each lower layer. Consequently, the user can promptly return to a desired upper layer while checking screens displayed in the return process.

In addition, continuously pressing the input switch 16 allows the user to automatically return to the top layer. In a configuration where the top layer provides the main menu, if the user is lost on layer during operation, keeping the input switch 16 pressed always allows the user to return to the main menu. In a configuration where the top layer provides a standby screen, keeping the input switch 16 pressed allows the user to promptly return to the standby screen for power saving. Consequently, the power consumption of the apparatus can be minimized, extending the battery life.

Figure 9:
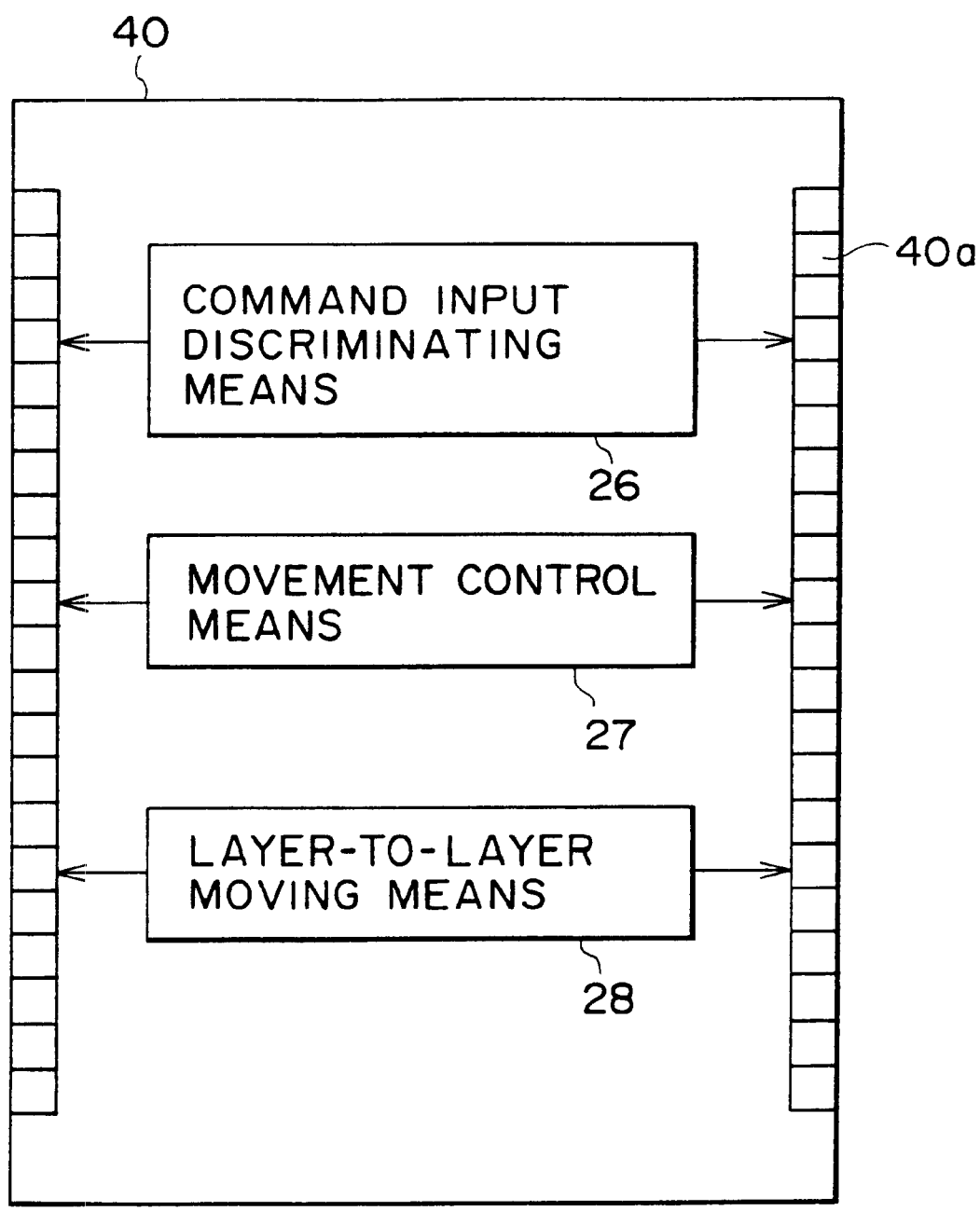
FIG. 9 is a diagram illustrating a constitution of a recording medium practiced as a second preferred embodiment of the invention.

FIG. 9 illustrates a constitution of a recording medium practiced as a second preferred embodiment of the invention. The following describes this recording medium with reference to FIG. 9.

The recording medium 40 is a one-chip semiconductor memory that stores at least three means in the form of programs (or procedures) readable and executable by a computer. These three means are accessible through a chip terminal 40*a*.

One of the above-mentioned three means is the command input discriminating means 26. The means 26 is read and executed by the central processing unit of the computer to determine whether a received input signal is supplied from an input means or generated by a predetermined command.

Another means is the movement control means 27. Based on the determination of the command input discriminating means 26, the movement control means 27 checks whether the generated input signal is still going on or not. If the input signal is found going on, the means 27 activates the layer-to-layer moving means 28. If the input signal is found ended, the means 27 ends the operation of the means 28.

The third means is the layer-to-layer moving means 28. The means 28 is read and executed by the CPU of the computer to cause movement between layers as instructed by the movement control means 27, executing a screen display operation on each destination layer.

The recording medium 40 can be installed, as a memory device storing CPU operating procedures, on a portable radio information terminal apparatus having information control means based on a multilayer configuration such as a data multilayer architecture in addition to the CPU, input device, image display device, and message recording memory.

The CPU sequentially executes the above-mentioned means stored in the mounted recording medium 40 as operating procedures to determine whether an input signal supplied from the input means has been generated by a predetermined command input and checks if the input signal is still going on. If the input signal is found going on, a layer-to-layer movement is executed to display a screen on the destination layer. The layer-to-layer movement can be repeated while the input signal is on. Consequently, the portable radio information terminal apparatus having the above-mentioned capabilities can be implemented.

The recording medium 40 can be constituted by any non-volatile semiconductor recording media including flash memory, read-only MOS memory, SRAM, EPROM, and EEPROM. Moreover, the recording medium 40 can also be constituted by optical, magneto-optical, or magnetic recording medium.

Figure 10:
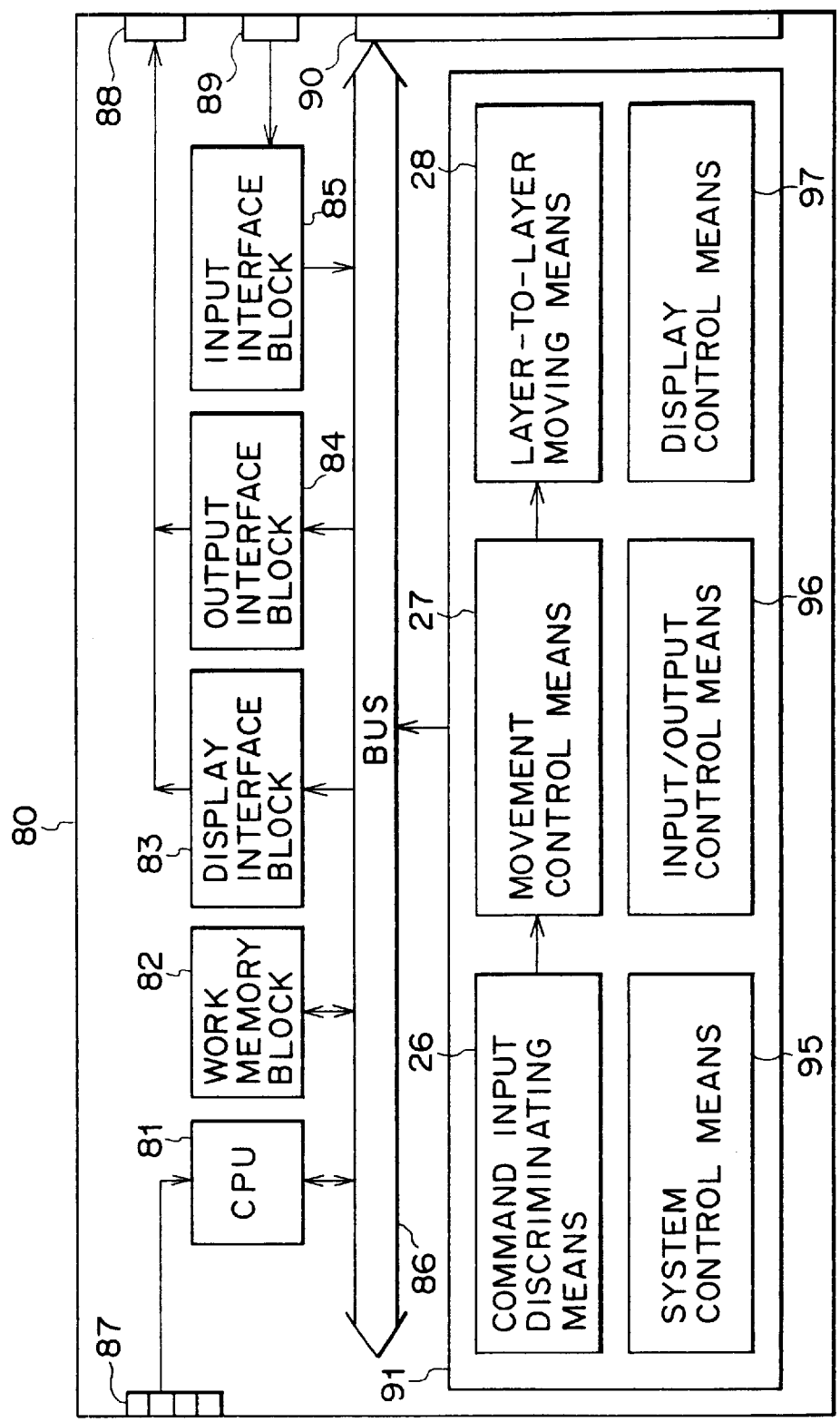
FIG. 10 is a block diagram illustrating a microcomputer apparatus practiced as a third preferred embodiment of the invention.

FIG. 10 is a block diagram illustrating a microcomputer apparatus practiced as a third preferred embodiment of the invention. The following describes this microcomputer apparatus with reference to FIG. 10.

The microcomputer apparatus 80 is a one-chip microcomputer incorporating an internal bus 86 and a central processing unit (CPU) 81, a work memory 82, a display interface 83, an output interface 84, an input interface 85, and a memory block 91 all connected to the internal bus 86.

External terminals provided on the one-chip microcomputer include an interrupt input terminal 87 connected to the interrupt input of the CPU 81, an output terminal 88 connected to a display interface 83 and an output interface 84, an input terminal 89 connected to an input interface 85, and a common bus terminal 90 connected to the internal bus 86.

The memory block 91 stores a system control means 95, an input/output control means 96, a display control means 97, the command input discriminating means 26, the movement control means 27, and the layer-to-layer moving means 28, each as a procedure executable by the CPU 81.

The system control means 95 not only controls the operations of the components of the microcomputer apparatus 80 but also controls an entire system in which this microcomputer apparatus 80 is incorporated. The control procedure depends on the system in which the microcomputer apparatus 80 is incorporated.

Likewise, the input/output control means 96 not only controls the transfer of data and signals between the microcomputer apparatus 80 and the outside thereof but also controls the transfer of data and signals between the system in which the microcomputer apparatus 80 is incorporated and the outside of the system. The control procedure depends on the system in which the microcomputer apparatus 80 is incorporated.

On the other hand, the display control means 97 controls display on an image display device externally connected to the microcomputer apparatus 80, mainly controlling screen displaying of message statements and various control icons.

The command input discriminating means 26 is read and executed by the CPU 81 to determine whether a received input signal is supplied from an input means or generated by a predetermined command.

The movement control means 27 is read by the CPU 81 to check, based on the decision of the command input discriminating means 26, whether the generated input signal is still going on or not. If the input signal is found going on, the means 27 activates the layer-to-layer moving means 28. If the input signal is found ended, the means 27 ends the operation of the means 28.

The layer-to-layer moving means 28 is read and executed by the CPU 81 to cause movement between layers as instructed by the movement control means 27, executing a screen display operation on each destination layer.

The microcomputer apparatus 80 can be installed on a portable radio information terminal apparatus having a communication system, a received message recording memory, a multilayer-based information control means, an input device, an image display device, and a power supply circuit.

The microcomputer apparatus 80 is installed on the terminal apparatus and sequentially executes the above-mentioned means stored in the memory block 91 as operating procedures to determine whether an input signal supplied from the input means has been generated by a predetermined command input and checks if the input signal is still going on. If the input signal is found going on, a layer-to-layer movement is executed to display a screen on the destination layer. The layer-to-layer movement can be repeated while the input signal is on. Consequently, the portable radio information terminal apparatus having the above-mentioned capabilities can be implemented.

Figure 11:
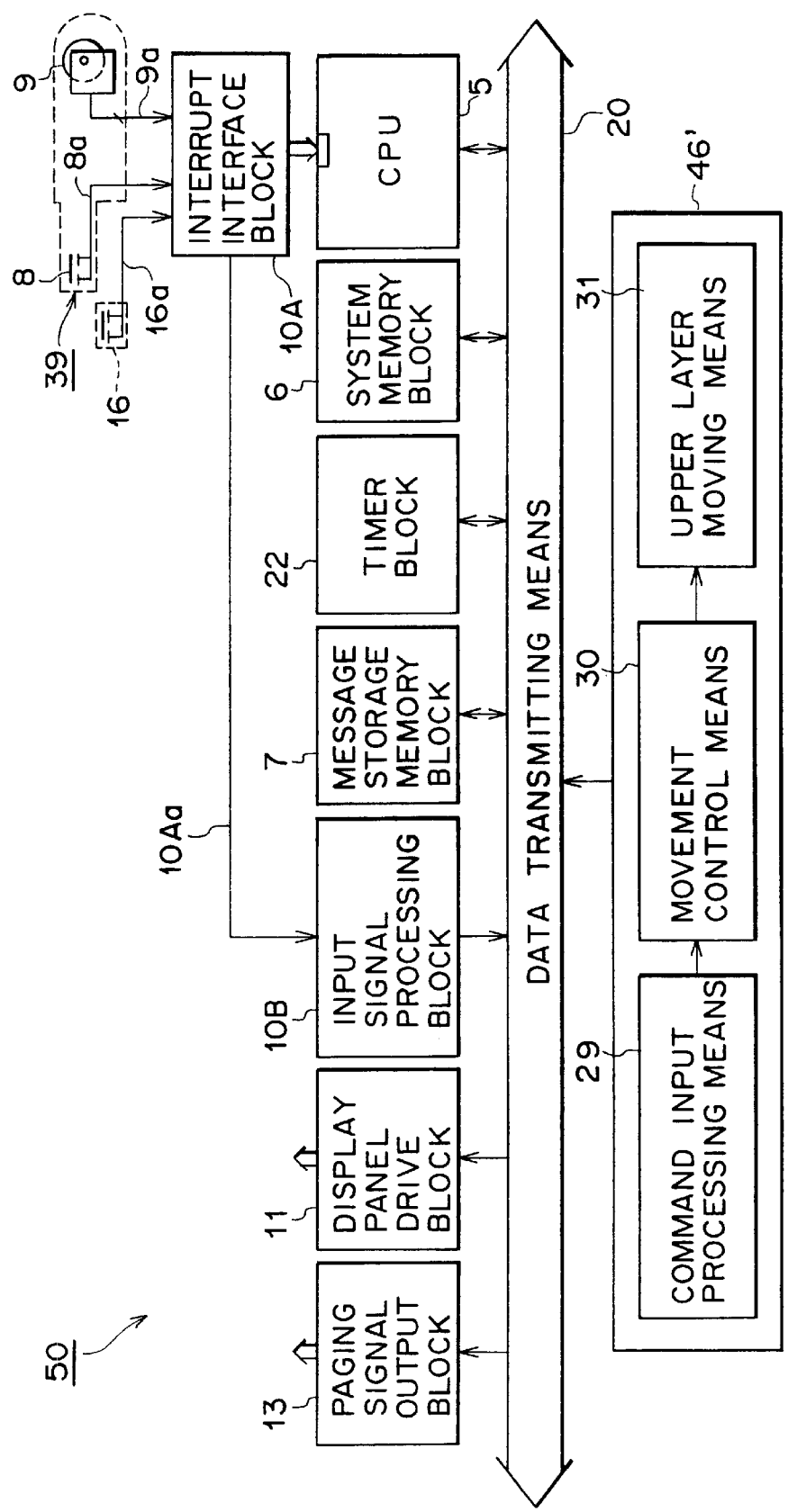
FIG. 11 is a block diagram illustrating the main constitution of a portable radio information terminal apparatus practiced as a fourth preferred embodiment of the invention.

FIG. 11 is a block diagram illustrating a main constitution of a portable radio information terminal apparatus practiced as a fourth preferred embodiment of the invention.

Figure 12:
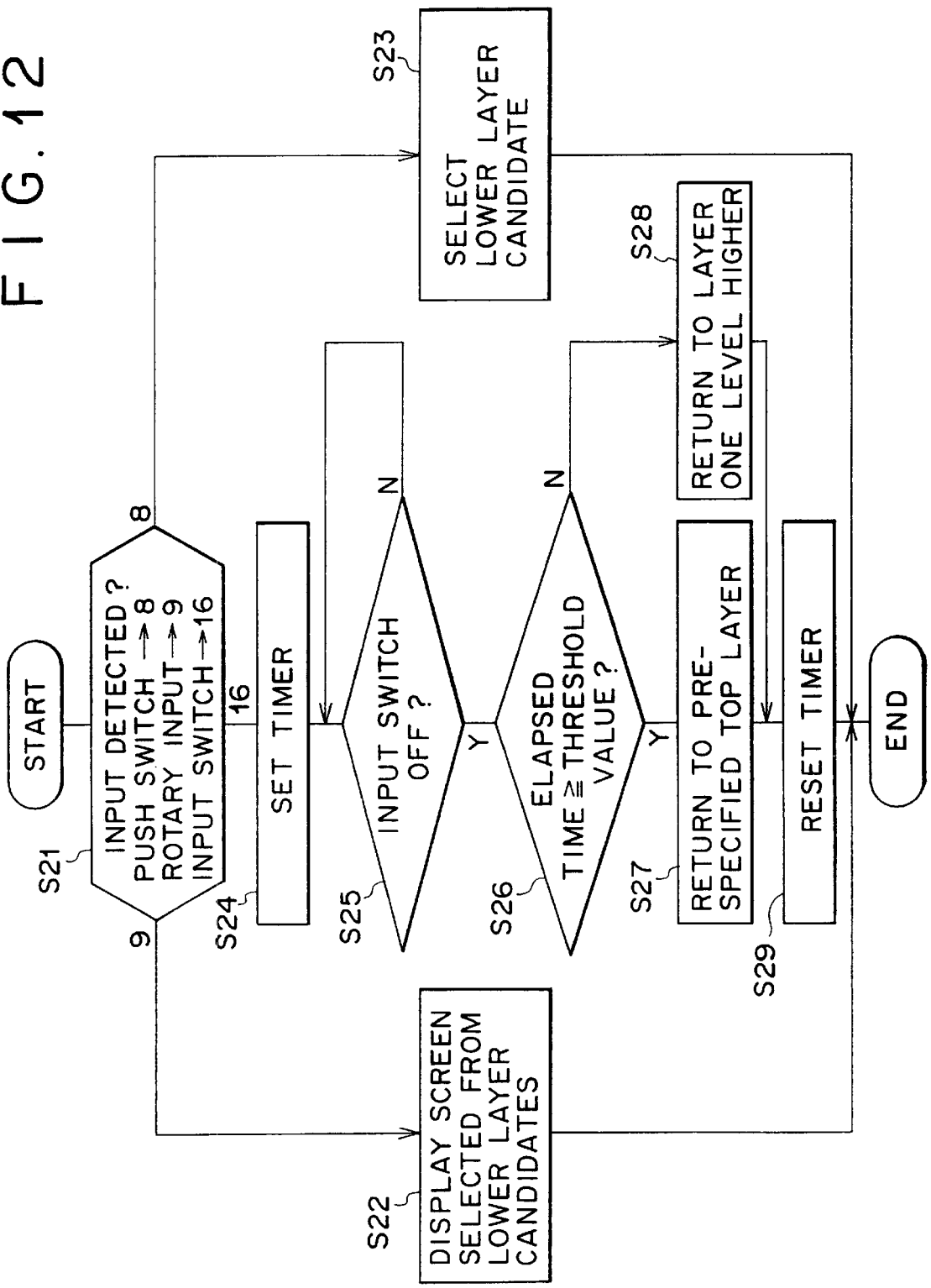
FIG. 12 is a flowchart indicative of operations of the portable radio information terminal apparatus practiced as a fourth preferred embodiment of the invention.

FIG. 12 is a flowchart indicative of the operation of the fourth preferred embodiment.

The following describes the constitution and operation of the fourth preferred embodiment with reference to FIGS. 11 and 12. With reference to FIGS. 11 and 12, components similar to those previously described with FIGS. 1 and 2 are denoted by the same reference numerals and omitted from the description.

A data transmitting means 20, which is the data bus of a portable radio information terminal apparatus 50, is connected to a CPU 5, a system memory 6, a ROM 46', a message storage memory 7, a timer 22, an input signal processing block 10B, a display panel driving block 11, and a paging signal output block 13.

Therefore, the CPU 5 transfers data with the system memory 6, the ROM 46', the timer 22, the message storage memory 7, the display panel driving block 11, the paging signal output block 13, and the input signal processing block 10B through the data transmitting means 20.

The ROM 46' is constituted by a read-only MOS memory or a flash memory and stores various means including a command input processing means 29, a movement control means 30, and an upper-layer moving means 31 in the form of programs executable by the CPU 5.

The command input processing means 29 is read and executed by the CPU 5 to determine whether an input signal has been generated by predetermined command input while the portable radio information terminal apparatus based on multilayer information control is operating on a given layer.

The movement control means 30 is read and executed by the CPU 5 to count the continuation time of the generated input signal. If the continuation time is found exceeding a predetermined value, the movement control means 30 instructs movement to the top layer. If the continuation time is found within the predetermined value, the means 30 instructs movement to an adjacent upper layer.

The upper-layer moving means 31 is read and executed by the CPU 5 to cause movement at least to the top layer or an adjacent upper layer based on the command of the movement control means 30.

FIG. 12 is a flowchart indicative of the operation of the portable radio information terminal apparatus practiced as the fourth preferred embodiment. The following describes this operation with reference to FIG. 12.

In step S21, an input signal is checked by the command input processing means 29. If the input signal is found generated by an rotary operation of the rotary data input device 9, a screen selected from lower-layer candidates is displayed in step S22, upon which the processing comes to an end.

If the input signal is found generated by a pushing operation of the push switch 8 in step S21, then a lower-layer candidate is selected in step S23, upon which the processing comes to an end.

If the input signal is found supplied from the input switch 16 in step S21, the movement control means 30 sets the timer 22 in step S24 and the processing is looped until the input switch 16 is turned off in step S25. During this time, the timer 22 counts time.

When the input switch 16 is turned off, the movement control means 30 compares the time (elapsed time) counted by the timer 22 with a predetermined threshold value in step S26. If the elapsed time is found exceeding the predetermined threshold value, the display returns to the top layer at once in step S27.

If the elapsed time is found below the predetermined threshold value, the display returns to a layer one level up in step S28.

Thus, according to the fourth preferred embodiment, continuously pressing the input switch 16 for longer than a predetermined time allows the user to return to the top layer at a single stroke. Therefore, specifying the table-of-contents screen as the top layer beforehand allows the user to return to the table of contents with a simple operation at a single stroke, enhancing ease of use of the apparatus.

Further, specifying the standby screen for power saving as the top layer beforehand allows the user to return to the standby screen upon completion of use by a simple operation, thereby minimizing power consumption to extend the battery life.

Figure 13:
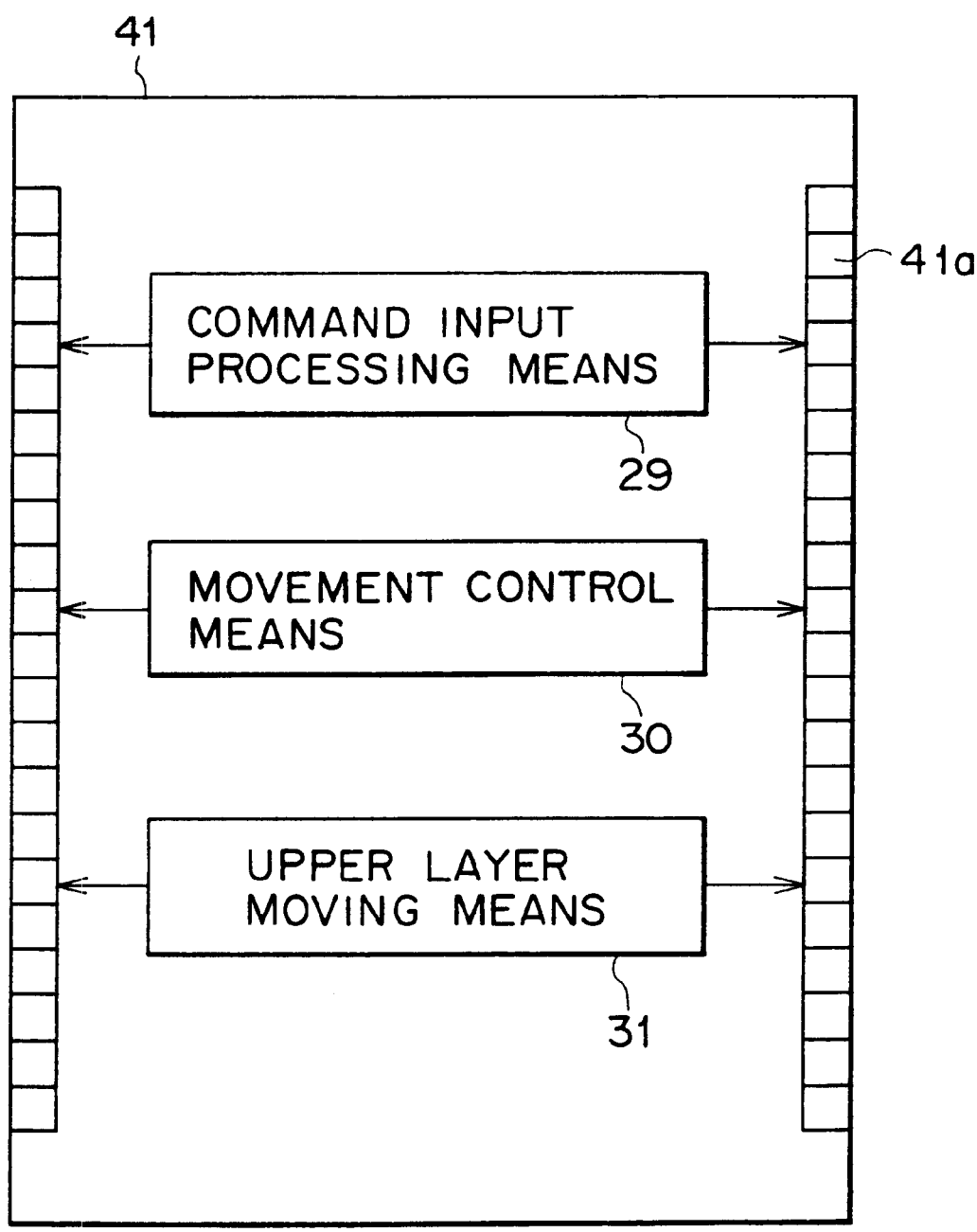
FIG. 13 is a diagram illustrating a constitution of a recording medium practiced as a fifth preferred embodiment of the invention.

FIG. 13 is a diagram illustrating the constitution of a recording medium practiced as a fifth preferred embodiment of the invention. The following describes this recording medium with reference to FIG. 13.

The recording medium 41 is a one-chip semiconductor memory that stores at least three means in the form of programs (or procedures) readable and executable by a computer. These three means are accessible through a chip terminal 41a.

One of the above-mentioned three means is the command input processing means 29. The means 29 is read and executed by the CPU of a computer to determine whether an input signal has been generated by predetermined command input while the portable radio information terminal apparatus based on multilayer information control is operating on a given layer.

Another means is a movement control means 30. The means 30 is read and executed by the CPU of the computer to count the continuation time of the generated input signal. If the continuation time is found exceeding a predetermined value, the movement control means 30 instructs movement to the top layer. If the continuation time is found within the predetermined value, the means 30 instructs movement to an adjacent upper layer.

The third means is an upper-layer moving means 31. The upper-layer moving means 31 is read and executed by the CPU of the computer to cause movement at least to the top layer or an adjacent upper layer based on the command of the movement control means 30.

The recording medium 41 can be installed, as a memory device storing CPU operating procedures, on a portable radio information terminal apparatus having information control means based on a multilayer configuration such as a data multilayer architecture in addition to the CPU, input device, image display device, and message recording memory.

When the means stored as operating procedures are sequentially executed by the CPU of the computer with the recording medium 41 loaded, the CPU determines, while the portable radio information terminal apparatus is operating on a given layer, whether an input signal supplied from the input means has been generated by a predetermined command input. Then, the continuation of the generated input signal is counted. If the continuation time is found exceeding a predetermined time, the screen moves to the top layer. If the continuation time is found within the predetermined time, the screen can move to an adjacent upper layer. Consequently, the portable radio information terminal apparatus having the above-mentioned capabilities can be implemented.

The recording medium 41 can be constituted by any non-volatile semiconductor recording media including flash memory, read-only MOS memory, SRAM, EPROM, and EEPROM. Moreover, the recording medium 40 can also be constituted by optical, magneto-optical, or magnetic recording medium.

Figure 14:
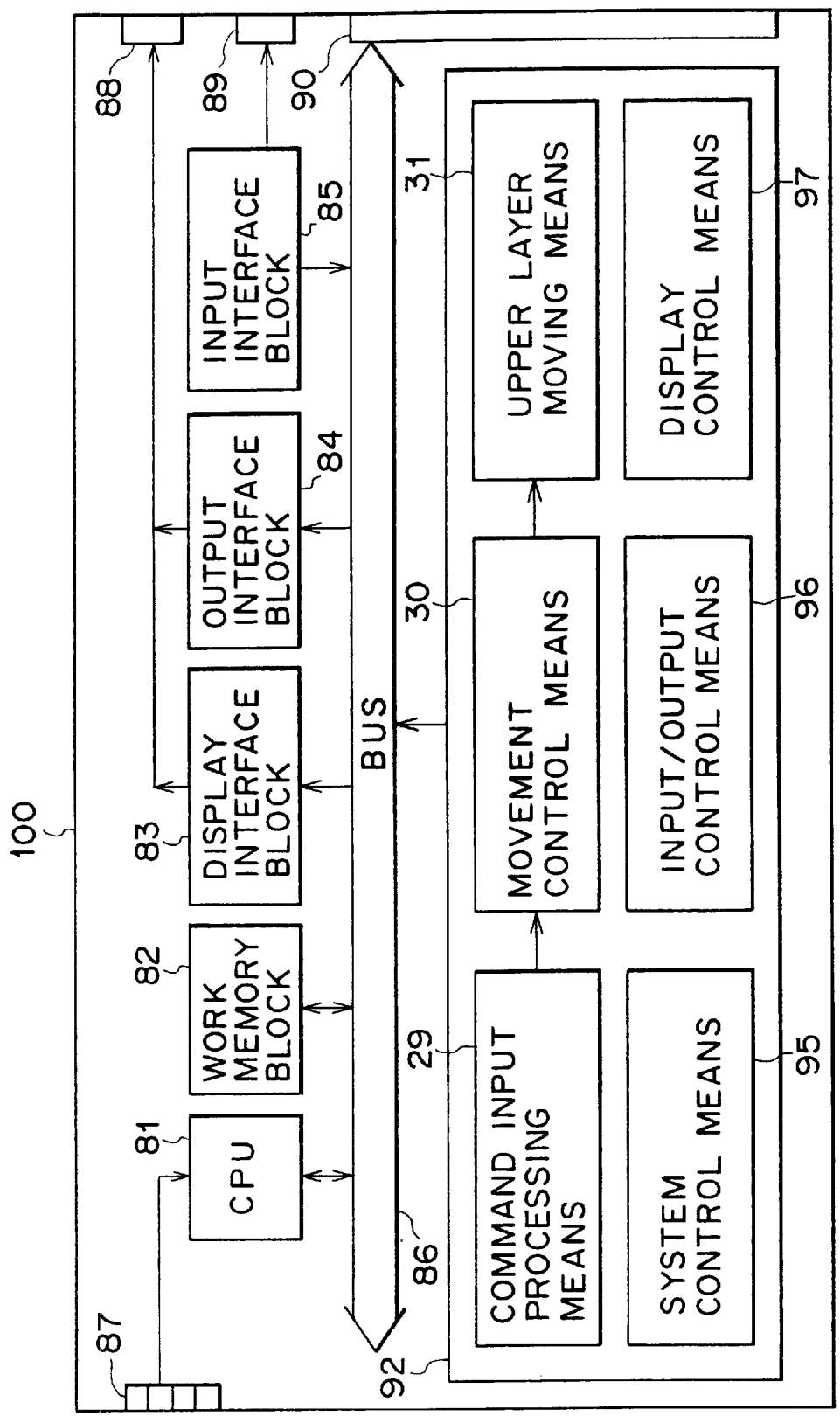
FIG. 14 is a block diagram illustrating a microcomputer apparatus practiced as a sixth preferred embodiment of the invention.

FIG. 14 is a block diagram illustrating a microcomputer apparatus practiced as a sixth preferred embodiment of the invention. The following describes this microcomputer apparatus with reference to FIG. 14. With reference to FIG. 14, components similar to those previously described with FIG. 10 are denoted by the same reference numerals and omitted from the description.

The microcomputer apparatus 100 is a one-chip microcomputer incorporating an internal bus 86 and a central processing unit (CPU) 81, a work memory 82, a display interface 83, an output interface 84, an input interface 85, and a memory block 92 all connected to the internal bus 86.

External terminals provided on the one-chip microcomputer include an interrupt input terminal 87 connected to the interrupt input of the CPU 81, an output terminal 88 connected to a display interface 83 and an output interface 84, an input terminal connected to an input interface 85, and a common bus terminal 90 connected to the internal bus 86.

The memory block 92 stores a system control means 95, an input/output control means 96, a display control means 97, a command input processing means 29, a movement control means 30, and an upper-layer moving means 31.

The system control means 95, the input/output control means 96, and the display control means 97 are generally the same as those of the third preferred embodiment.

The command input processing means 29 is read and executed by the CPU 81 to determine whether an input signal has been generated by predetermined command input while the portable radio information terminal apparatus having an image display device and an input device based on multilayer information control is operating on a given layer.

The movement control means 30 is read and executed by the CPU 81 to count the continuation time of the generated input signal. If the continuation time is found exceeding a predetermined value, the movement control means 29 instructs movement to the top layer. If the continuation time is found within the predetermined value, the means 30 instructs movement to an adjacent upper layer.

The upper-layer moving means 31 is read and executed by the CPU 81 to cause movement at least to the top layer or an adjacent upper layer based on the command of the movement control means 30.

The microcomputer apparatus 100 can be installed on a portable radio information terminal apparatus having a communication system, a received message recording memory, a multilayer-based information control means, an input device, an image display device, and a power supply circuit.

The microcomputer apparatus 100 is installed on the terminal apparatus and sequentially executes the above-mentioned means stored in the memory block 92 as operating procedures to determine whether an input signal supplied from the input means has been generated by a predetermined command input and count the continuation time of the generated input signal. If the input signal is found exceeding a predetermined time, the screen moves to the top layer. If the continuation time is found within the predetermined time, the screen moves to an adjacent upper layer. Consequently, the portable radio information terminal apparatus having the above-mentioned capabilities can be implemented.

While the preferred embodiments of the present invention have been described using specific terms, such description is for illustrative purposes only, and it is to be understood that changes and variations may be made without departing from the spirit or scope of the appended claims.

What is claimed is:

1. A screen operating method for a portable radio information terminal apparatus for executing information control of a multilayer structure having a plurality of layers including a top layer, a middle layer, and a lower layer on which a plurality of messages terminated at said portable radio information terminal apparatus are placed, said top layer thereof being one of a main menu screen displaying layer and a standby screen displaying layer, said portable radio information terminal apparatus executing operations including screen displaying on each of said plurality of layers and including inputting means for executing a command inputting operation and an image display device for screen displaying, comprising the step of:

moving said screen displaying from said lower layer to said top layer of said multilayer structure when an activation time of said command inputting operation exceeds a predetermined time; and moving said screen displaying from said lower layer to said middle layer of said multilayer structure when said activation time of said command inputting operation is less than said predetermined time.

2. A portable radio information terminal apparatus for executing information control of a multilayer structure having a plurality of layers including a top layer, a middle layer, and a lower layer on which a plurality of messages terminated at said portable radio information terminal apparatus are placed, said top layer thereof being one of a main menu screen displaying layer and a standby screen displaying layer, for executing operations including screen displaying on each of said plurality of layers and including inputting means for executing a command inputting operation and an image display device for screen displaying, said portable radio information terminal apparatus comprising:

command input processing means for determining whether an input signal supplied from said inputting means is generated by said command inputting operation;

movement control means for measuring, based on a decision by said command input processing means, an activation time of said input signal; and upper-layer moving means for executing, based on a command issued by said movement control means, movement among said plurality of layers, wherein when said activation time exceeds a predetermined time said movement control means instructs said upper-layer moving means to move said screen displaying from said lower layer to said top layer, and when said activation time is less than said predetermined time said movement control means instructs said upper-layer moving means to move said screen displaying from said lower layer to said middle layer.

3. A recording medium for recording a plurality of programs readable and executable by a computer, comprising:

command input processing means for determining whether an input signal is generated in response to a command inputting operation while a portable radio information terminal apparatus having an image display device and an inputting device and executing information control on a multilayer structure having a plurality of layers including a top layer, a middle layer, and a lower layer, said top layer being one of a main menu displaying layer and a standby screen displaying layer;

movement control means for measuring, based on a decision by said command input processing means, an activation time of said input signal; and upper-layer moving means for executing, based on a command issued by said movement control means, movement among said plurality of layers, wherein when said activation time exceeds a predetermined time said movement control means instructs said upper-layer moving means to move said screen displaying from said lower layer to said top layer, and when said activation time is less than said predetermined time said movement control means instructs said upper-layer moving means to move said screen displaying from said lower layer to said middle layer.

4. A microcomputer apparatus, comprising:

a central processing unit;

recording means for recording a procedure readable and executable by said central processing unit as a program; and communication means connected at least to said central processing unit and said recording means, including data transmitting means connectable from an outside of said microcomputer apparatus, and for providing a capability of transmitting a signal generated from a processing operation of said central processing unit with an external device through one of a cable and a radio wave, wherein said recording means records said procedure including at least command input processing means for determining whether an input signal is generated in response to a command inputting operation while a portable radio information terminal apparatus having an image display device and an inputting device and executing information control on a multilayer structure having a plurality of layers including a top layer, a middle layer, and a lower layer, said top layer being one of a main menu displaying layer and a standby screen displaying layer;

movement control means for measuring, based on a decision by said command input processing means, an activation time of said input signal, and upper-layer moving means for executing, based on a command issued by said movement control means, movement among said plurality of layers, wherein when said activation time exceeds a predetermined time said movement control means instructs said upper-layer moving means to move said screen displaying from said lower layer to said top layer, and when said activation time is within said predetermined time said movement control means instructs said upper-layer moving means to move said screen displaying from said lower layer to said middle layer.

\* \* \* \* \*

(12) EX PARTE REEXAMINATION CERTIFICATE (8623rd)
United States Patent
Furuya

(10) Number: US 6,389,301 C1
(45) Certificate Issued: Oct. 11, 2011

(54) PORTABLE RADIO INFORMATION TERMINAL APPARATUS, DISPLAY SCREEN OPERATING METHOD, RECORDING MEDIUM, AND MICROCOMPUTER APPARATUS

(75) Inventor: Mami Furuya, Tokyo (JP)

(73) Assignee: Mobilemedia Ideas LLC, Chevy Chase, MD (US)

Reexamination Request:
No. 90/011,630, Apr. 6, 2011

Reexamination Certificate for:
Patent No.: 6,389,301
Issued: May 14, 2002
Appl. No.: 09/219,418
Filed: Dec. 23, 1998

(51) Int. Cl.
*H04Q 1/38* (2006.01)
*H04M 1/725* (2006.01)
*H04M 1/72* (2006.01)

(52) U.S. Cl. ............ 455/566; 455/575.4
(58) Field of Classification Search ............ 455/566
See application file for complete search history.

(56) References Cited

U.S. PATENT DOCUMENTS

| | | |
|---|---|---|
| 4,870,702 A | 9/1989 | Azzouni |
| 4,949,085 A | 8/1990 | Fisch et al. |
| 5,184,120 A | 2/1993 | Schultz |
| 5,285,493 A | 2/1994 | Wagai et al. |
| 5,311,175 A | 5/1994 | Waldman |
| 5,436,954 A | 7/1995 | Nishiyama et al. |
| 5,475,653 A | 12/1995 | Yamada et al. |
| 5,477,508 A | 12/1995 | Will |
| 5,542,103 A | 7/1996 | Mottier et al. |
| 5,594,778 A | 1/1997 | Schaupp, Jr. et al. |
| 5,627,531 A | 5/1997 | Posso et al. |
| 5,650,776 A | 7/1997 | Mitchell et al. |
| 5,705,995 A | 1/1998 | Laflin et al. |
| 5,712,624 A | 1/1998 | Ayerst et al. |
| 5,760,773 A | 6/1998 | Berman et al. |

(Continued)

FOREIGN PATENT DOCUMENTS

| | | |
|---|---|---|
| EP | 0 679 003 A2 | 10/1995 |
| EP | 0 792 056 A2 | 8/1997 |
| EP | 0 803 849 A1 | 10/1997 |
| JP | S63-66625 | 3/1988 |
| JP | S63-231612 | 9/1988 |

(Continued)

OTHER PUBLICATIONS

Motorola TDB, Chia, Jeffrey et al., "User Definable Pager," Jul. 1, 1995 (7 pages).

IBM TDB, Johnson W.J. et al., "Multiple–Position Pushbutton Metaphor for Graphical Desktop," Jan. 1, 1994 (3 pages).

*Primary Examiner* — Roland G. Foster

(57) ABSTRACT

A portable radio information terminal apparatus capable of promptly moving a screen display to a desired layer in a multilayer screen display structure and a screen operating method for use in the apparatus. The terminal apparatus includes a command inputting discriminating circuit for determining whether an input signal supplied from an inputting circuit is generated by a predetermined command inputting operation, a movement control circuit for determining, based on a decision made by the command inputting discriminating circuit, whether the generated input signal continues and, if the generated input signal is found continuing, activating a layer-to-layer moving circuit and, if the generated input signal is stopped, stopping the layer-to-layer moving circuit. The layer-to-layer moving circuit causes for a layer-to-layer moving operation based on a command issued by the movement control circuit and executing a screen displaying operation on a destination layer, wherein, while the generated input signal continues, the layer-to-layer moving operation and the screen display operation on the destination layer are repeated.

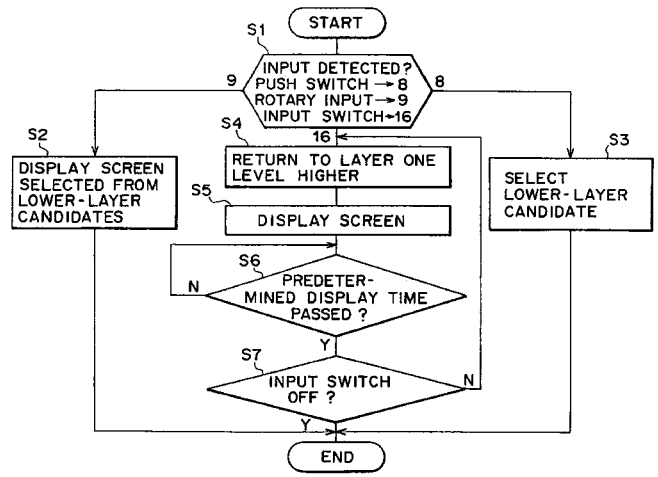

U.S. PATENT DOCUMENTS

| | | | |
|---|---|---|---|
| 5,761,610 | A | 6/1998 | Sorensen et al. |
| 5,774,540 | A | 6/1998 | Davidson et al. |
| 5,786,819 | A | 7/1998 | Weiser et al. |
| 5,805,084 | A | 9/1998 | Männistö |
| 5,903,852 | A | 5/1999 | Schaupp, Jr. et al. |
| 5,931,873 | A | 8/1999 | Cisar |
| 5,936,548 | A | 8/1999 | Takatsuka |
| 5,966,671 | A | 10/1999 | Mitchell et al. |
| 6,021,193 | A | 2/2000 | Thomas |
| 6,073,036 | A | 6/2000 | Heikkinen et al. |
| 6,138,039 | A | 10/2000 | Sudo et al. |
| 6,161,026 | A | 12/2000 | Uchida |
| 6,178,338 | B1 | 1/2001 | Yamagishi et al. |
| 6,246,406 | B1 | 6/2001 | Nielsen et al. |
| 6,249,689 | B1 | 6/2001 | Aizawa |
| 6,297,795 | B1 | 10/2001 | Kato et al. |
| 6,331,877 | B1 | 12/2001 | Bennington et al. |
| 7,062,777 | B2 | 6/2006 | Alba et al. |
| 7,363,645 | B1 | 4/2008 | Hendricks |

FOREIGN PATENT DOCUMENTS

| | | |
|---|---|---|
| JP | H05-346842 | 12/1993 |
| JP | S06-07880 | 3/1994 |
| JP | H06-301461 | 10/1994 |
| JP | H07-146629 | 6/1995 |
| JP | H08-130597 | 5/1996 |
| JP | H8-265193 | 10/1996 |
| JP | H 8-265193 | 10/1996 |
| JP | H08-335155 | 12/1996 |
| JP | S09-084087 | 3/1997 |
| JP | H09-222946 | 8/1997 |
| WO | 95/31863 | 11/1995 |

US 6,389,301 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-4 are determined to be patentable as amended.

New claims 5-24 are added and determined to be patentable.

1. A screen operating method for a portable radio information terminal apparatus for executing information control of a multilayer structure having a plurality of layers including a top layer, a middle layer, and a lower layer on which a plurality of messages terminated at said portable radio information terminal apparatus are placed, *wherein the messages terminated at said portable radio information terminal apparatus are defined as messages that are addressed to said portable radio information terminal apparatus,* said top layer thereof being one of a main menu screen displaying layer and a standby screen displaying layer, said portable radio information terminal apparatus executing operations including screen displaying on each of said plurality of layers and including inputting means for executing a command inputting operation and an image display device for screen displaying, comprising the step of:
   moving said screen displaying from said lower layer to said top layer of said multilayer structure when an activation time of said command inputting operation exceeds a predetermined time; and
   moving said screen displaying from said lower layer to said middle layer of said multilayer structure when said activation time of said command inputting operation is less than said predetermined time.

2. A portable radio information terminal apparatus for executing information control of a multilayer structure having a plurality of layers including a top layer, a middle layer, and a lower layer on which a plurality of messages terminated at said portable radio information terminal apparatus are placed, *wherein the messages terminated at said portable radio information terminal apparatus are defined as messages that are addressed to said portable radio information terminal apparatus,* said top layer thereof being one of a main menu screen displaying layer and a standby screen displaying layer, for executing operations including screen displaying on each of said plurality of layers and including inputting means for executing a command inputting operation and an image display device for screen displaying, said portable radio information terminal apparatus comprising:
   command input processing means for determining whether an input signal supplied from said inputting means is generated by said command inputting operation;
   movement control means for measuring, based on a decision by said command input processing means, an activation time of said input signal; and
   upper-layer moving means for executing, based on a command issued by said movement control means, movement among said plurality of layers, wherein
   when said activation time exceeds a predetermined time said movement control means instructs said upper-layer moving means to move said screen displaying from said lower layer to said top layer, and
   when said activation time is less than said predetermined time said movement control means instructs said upper-layer moving means to move said screen displaying from said lower layer to said middle layer.

3. A recording medium for recording a plurality of programs readable and executable by a computer, comprising:
   command input processing means for determining whether an input signal is generated in response to a command inputting operation while a portable radio information terminal apparatus having an image display device and an inputting device and executing information control on a multilayer structure having a plurality of layers including a top layer, a middle layer, and a lower layer *on which a plurality of messages terminated at said portable radio information terminal apparatus are placed, wherein the messages terminated at said portable radio information terminal apparatus are defined as messages that are addressed to said portable radio information terminal apparatus,* said top layer being one of a main menu displaying layer and a standby screen displaying layer;
   movement control means for measuring, based on a decision by said command input processing means, an activation time of said input signal; and
   upper-layer moving means for executing, based on a command issued by said movement control means, movement among said plurality of layers, wherein
   when said activation time exceeds a predetermined time said movement control means instructs said upper-layer moving means to move said screen displaying from said lower layer to said top layer, and
   when said activation time is less than said predetermined time said movement control means instructs said upper-layer moving means to move said screen displaying from said lower layer to said middle layer.

4. A microcomputer apparatus, comprising:
   a central processing unit;
   recording means for recording a procedure readable and executable by said central processing unit as a program; and
   communication means connected at least to said central processing unit and said recording means, including data transmitting means connectable from an outside of said microcomputer apparatus, and for providing a capability of transmitting a signal generated from a processing operation of said central processing unit with an external device through one of a cable and a radio wave,
   wherein said recording means records said procedure including at least
      command input processing means for determining whether an input signal is generated in response to a command inputting operation while a portable radio information terminal apparatus having an image display device and an inputting device and executing information control on a multilayer structure having a plurality of layers including a top layer, a middle layer, and a lower layer *on which a plurality of mes-* sages terminated at said portable radio information terminal apparatus are placed, wherein the messages terminated at said portable radio information terminal apparatus are defined as messages that are addressed to said portable radio information terminal apparatus, said top layer being one of a main menu displaying layer and a standby screen displaying layer;

movement control means for measuring, based on a decision by said command input processing means, an activation time of said input signal, and upper-layer moving means for executing, based on a command issued by said movement control means, movement among said plurality of layers, wherein when said activation time exceeds a predetermined time said movement control means instructs said upper-layer moving means to move said screen displaying from said lower layer to said top layer; and when said activation time is within said predetermined time said movement control means instructs said upper-layer moving means to move said screen displaying from said lower layer to said middle layer.

5. The method of claim 1, wherein said top layer thereof is a main menu screen displaying layer.

6. The method of claim 1, wherein said top layer thereof is a standby screen displaying layer.

7. The apparatus of claim 2, wherein said top layer thereof is a main menu screen displaying layer.

8. The apparatus of claim 2, wherein said top layer thereof is a standby screen displaying layer.

9. The apparatus of claim 2, wherein said inputting means for executing a command inputting operation is responsive to movement in a first direction and is responsive to movement in a second direction that is opposite to the first direction, and wherein said inputting means also includes a push switch that that is actuated by pressing in a direction that is perpendicular to the first direction.

10. The apparatus of claim 2, wherein the apparatus is a personally carryable handheld device.

11. The apparatus of claim 2, wherein the apparatus displays messages with alphanumeric characters.

12. The apparatus of claim 2, wherein the apparatus includes paging capabilities.

13. The apparatus of claim 2, wherein the apparatus generates an audible alert when a message is terminated.

14. The apparatus of claim 2, wherein the apparatus implements a procedure for locking of information data.

15. The recording medium of claim 3, wherein said top layer thereof is a main menu screen displaying layer.

16. The recording medium of claim 3, wherein said top layer thereof is a standby screen displaying layer.

17. The apparatus of claim 4, wherein said top layer thereof is a main menu screen displaying layer.

18. The apparatus of claim 4, wherein said top layer thereof is a standby screen displaying layer.

19. The apparatus of claim 4, wherein said command input processing means is responsive to movement in a first direction and is responsive to movement in a second direction that is opposite to the first direction, and wherein said command input processing means also includes a push switch that that is actuated by pressing in a direction that is perpendicular to the first direction.

20. The apparatus of claim 4, wherein the apparatus is a personally carryable handheld device.

21. The apparatus of claim 4, wherein the apparatus displays messages with alphanumeric characters.

22. The apparatus of claim 4, wherein the apparatus includes paging capabilities.

23. The apparatus of claim 4, wherein the apparatus generates an audible alert when a message is terminated.

24. The apparatus of claim 4, wherein the apparatus implements a procedure for locking of information data.

\* \* \* \* \*